United States Patent
Gholmieh et al.

(10) Patent No.: US 10,779,194 B2
(45) Date of Patent: Sep. 15, 2020

(54) PREFERRED PATH NETWORK SCHEDULING IN MULTI-MODEM SETUP

(71) Applicant: QUALCOMM Incorporated, San Diego, CA (US)

(72) Inventors: Ralph Akram Gholmieh, San Diego, CA (US); Susheel Kumar Yadav Yadagiri, San Diego, CA (US); Sanjay Vishin, Sunnyvale, CA (US); Siddharth Chitnis, San Diego, CA (US); Varun Tutpetkeshavamurthy, San Diego, CA (US); Bojun Pan, San Diego, CA (US); Vaibhav Kumar, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 15/924,188

(22) Filed: Mar. 17, 2018

(65) Prior Publication Data
US 2018/0279175 A1    Sep. 27, 2018

Related U.S. Application Data

(60) Provisional application No. 62/477,020, filed on Mar. 27, 2017, provisional application No. 62/584,713, filed on Nov. 10, 2017.

(51) Int. Cl.
*H04W 28/08* (2009.01)
*H04L 12/707* (2013.01)
(Continued)

(52) U.S. Cl.
CPC ............. *H04W 28/08* (2013.01); *H04L 45/24* (2013.01); *H04L 47/6215* (2013.01);
(Continued)

(58) Field of Classification Search
CPC ......... H04W 4/40; H04W 4/44; H04W 28/08; H04L 45/24
See application file for complete search history.

(56) References Cited

U.S. PATENT DOCUMENTS

| 8,873,529 | B2 * | 10/2014 | Moeller | ................ H04L 41/048 370/310 |
| 9,525,562 | B2 | 12/2016 | Atkinson et al. | |

(Continued)

FOREIGN PATENT DOCUMENTS

WO    2017171909 A1    10/2017

OTHER PUBLICATIONS

Halepoto I.A., et al., "Concurrent Multipath Transfer Under Delay-Based Dissimilarity Using SCTP", Second International Conference on Computing Technology and Information Management (ICCTIM), Apr. 21, 2015 (Apr. 21, 2015), XP033209647, pp. 180-185, DOI: 10.1109/ICCTIM.2015.7224614, [retrieved on Aug. 25, 2015].

(Continued)

*Primary Examiner* — Rhonda L Murphy
(74) *Attorney, Agent, or Firm* — The Marbury Law Group, PLLC

(57) ABSTRACT

Systems, methods, and devices of the various embodiments provide for multipath transport of Internet Protocol (IP) packets by a computing device including a plurality of modems. In various embodiments, IP packets may be assigned to a selected one of a plurality of modems for transport based on available bandwidths of each of the plurality of modems.

14 Claims, 18 Drawing Sheets

(51) Int. Cl.
  *H04W 4/44*  (2018.01)
  *H04L 12/863*  (2013.01)
  H04L 12/729  (2013.01)
  H04W 4/40  (2018.01)
  H04L 12/727  (2013.01)

(52) U.S. Cl.
  CPC ............ *H04W 4/44* (2018.02); *H04L 45/121* (2013.01); *H04L 45/125* (2013.01); *H04W 4/40* (2018.02)

(56) References Cited

U.S. PATENT DOCUMENTS

| 2009/0016358 | A1* | 1/2009 | Lee ..................... H04L 12/2854 |
| | | | 370/395.53 |
| 2012/0207021 | A1 | 8/2012 | Rahman et al. |
| 2015/0375764 | A1 | 12/2015 | Rajendran et al. |
| 2017/0142027 | A1 | 5/2017 | Teter et al. |
| 2017/0163398 | A1 | 6/2017 | Ross et al. |
| 2017/0293500 | A1* | 10/2017 | Molina ............... G06F 9/45558 |
| 2017/0325221 | A1 | 11/2017 | Jalali |
| 2019/0312815 | A1* | 10/2019 | Altman ................. H04L 43/026 |

OTHER PUBLICATIONS

International Search Report and Written Opinion6—PCT/US2018/023062—ISA/EPO—dated Jun. 27, 2018. 18 pages.

* cited by examiner

PREFERRED PATH NETWORK SCHEDULING IN MULTI-MODEM SETUP

RELATED APPLICATIONS

This application claims the benefit of priority to U.S. Provisional Patent Application 62/477,020 entitled "Preferred Path Network Scheduling In Multi-modem Setup," filed Mar. 27, 2017 and to U.S. Provisional Patent Application 62/584,713 entitled "Preferred Path Network Scheduling In Multi-modem Setup," filed Nov. 10, 2017. The entire contents of both applications are hereby incorporated by reference for all purposes.

BACKGROUND

Vehicles, such as driverless cars, may include systems, such as sensors, cameras, etc., that generate data that can be sent to other devices remote from the vehicle, such as a remote computing device, remote servers, other vehicles, etc. Additionally, vehicles, such as driverless cars, can receive data from other devices remote from the vehicle, such as remote computing device, remote servers, other vehicles, etc. Such generated and/or received data may be used by the vehicle and/or the other devices remote from the vehicle to support operations of the vehicle, other vehicles, support systems, traffic management, etc.

As an example, autonomous and semi-autonomous vehicles, such as driverless cars, can operate autonomously in many situations. Sensors, cameras, and other systems of the vehicle may provide inputs to the vehicle's control system that enable the control system to operate the vehicle autonomously. However, in some situations an autonomous or semi-autonomous vehicle may not be able to effectively operate autonomously, and remote teleoperation of the vehicle may be beneficial in those scenarios, even for just a short period of time. Communicating the sensor inputs received by the vehicle's control system to the remote teleoperator may enable the remote teleoperator to manually operate or guide the vehicle through the situation.

SUMMARY

The systems, methods, and devices of the various embodiments provide for multipath transport of Internet Protocol (IP) packets by a computing device including a plurality of modems. Various embodiments may provide for multipath transport of IP packets by an in-vehicle computing device, such as a control system for an autonomous or semi-autonomous car. In various embodiments, IP packets may be assigned to a selected one of a plurality of modems for transport based on available bandwidths of each of the plurality of modems. In various embodiments, in response to an available bandwidth of the selected one of the plurality of modems dropping below a quality threshold, IP packets may be assigned to all of the plurality of modems for transport for a switch period of time. In response to the switch period of time expiring, a modem of the plurality of modems meeting a selection criterion may be selected as the one of the plurality of modems for transport. In various embodiments, the selection criterion may include one or more of path preferences, air interface available queue size estimates, air interface available bandwidth estimates, end-to-end bandwidth estimates, and end-to-end delay estimates. In various embodiments, in response to an available bandwidth of the selected one of the plurality of modems dropping below the quality threshold and User Datagram Protocol (UDP) packets being assigned to at least one of the plurality of modems, a modem of the plurality of modems meeting a selection criterion may be selected as the one of the plurality of modems for transport of Transmission Control Protocol (TCP) packets. In various embodiments, TCP packets and UDP packets may be assigned to one of a plurality of modems through path selection based on preferences and/or local packet scheduling based on least-delay estimates. In various embodiments, TCP packets and UDP packets may be assigned to one of a plurality of modems based on different requirements or the same requirements. In various embodiments, assignment and/or re-assignment of UDP packets to a new one of a plurality of modems based on local least-delay estimates may be prevented when a local least-delay estimate for a previous one of the plurality of modems is below a delay threshold. In various embodiments, a backend server may route traffic to a computing device including a plurality of modems via a selected one of the plurality of modems.

Various embodiments include methods that may be implemented in a scheduler running on a processor of an in-vehicle computing device for IP transmission from a vehicle. Various embodiments may include determining whether an available bandwidth of a selected one of a plurality of modems drops below a quality threshold, assigning IP packets to all of the plurality of modems for transport in response to determining that the available bandwidth of the selected one of the plurality of modems has dropped below the quality threshold, determining whether any of the plurality of modems meet a selection criterion, selecting one modem of the plurality of modems meeting the selection criterion as a new selected one of the plurality of modems, and assigning IP packets to only the new selected one of the plurality of modems for transport. In some embodiments, the available bandwidth of the selected one of the plurality of modems may be an air interface available bandwidth estimate or an end-to-end bandwidth estimate.

Some embodiments may further include determining whether the selected one of the plurality of modems is associated with a highest priority delivery path and determining whether the available bandwidth of the selected one of the plurality of modems drops below the quality threshold may include determining whether the available bandwidth of the selected one of the plurality of modems drops below the quality threshold in response to determining that the selected one of the plurality of modems is associated with the highest priority delivery path. Such embodiments may further include determining whether a broadcast time threshold is exceeded in response to determining that the selected one of the plurality of modems is not associated with the highest priority delivery path and assigning IP packets to all of the plurality of modems for transport may include assigning IP packets to all of the plurality of modems for transport in response to the broadcast time threshold being exceeded.

In some embodiments, the selection criterion may include one or more of a path preference, an air interface queue size estimate, an air interface available bandwidth estimate, an end-to-end bandwidth estimate, and an end-to-end delay estimate.

Some embodiments may further include determining whether UDP packets are being assigned to all modems of the plurality of modems in response to determining that the available bandwidth of the selected one of the plurality of modems drops below the quality threshold and determining whether any of the plurality of modems meet a selection criterion in response to determining that UDP packets are being assigned to all modems of the plurality of modems. In such embodiments, TCP packets and UDP packets may be assigned to one of the plurality of modems based at least in part on one or more of a path selection based on a preference or packet scheduling based on local least-delay estimates. In some embodiments, the plurality of modems may be three or more modems.

Various embodiments include methods that may be implemented in a scheduler running on a processor of an in-vehicle computing device for IP transmission from a vehicle. Various embodiments may include receiving a packet for transport, determining delivery delays associated with a plurality of modems, determining whether a delivery delay of a modem of the plurality of modems associated with transporting a last packet is below a delay threshold, assigning the packet to the modem of the plurality of modems associated with transporting the last packet in response to determining that the delivery delay of the modem of the plurality of modems associated with transporting the last packet is below the delay threshold, and assigning the packet to a one of the plurality of modems with a lowest delivery delay in response to determining that the delivery delay of the modem of the plurality of modems associated with transporting the last packet is at or above the delay threshold. In some embodiments, the delay threshold may be relative to a lowest delivery path delay.

Further embodiments may include an in-vehicle computing device having a processor configured with processor executable instructions to perform operations of any of the methods summarized above. Further embodiments may include in-vehicle computing device having means for performing functions of any of the methods summarized above. Further embodiments may include non-transitory processor-readable media on which are stored processor-executable instructions configured to cause a processor of an in-vehicle computing device to perform operations of any of the methods summarized above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1A:
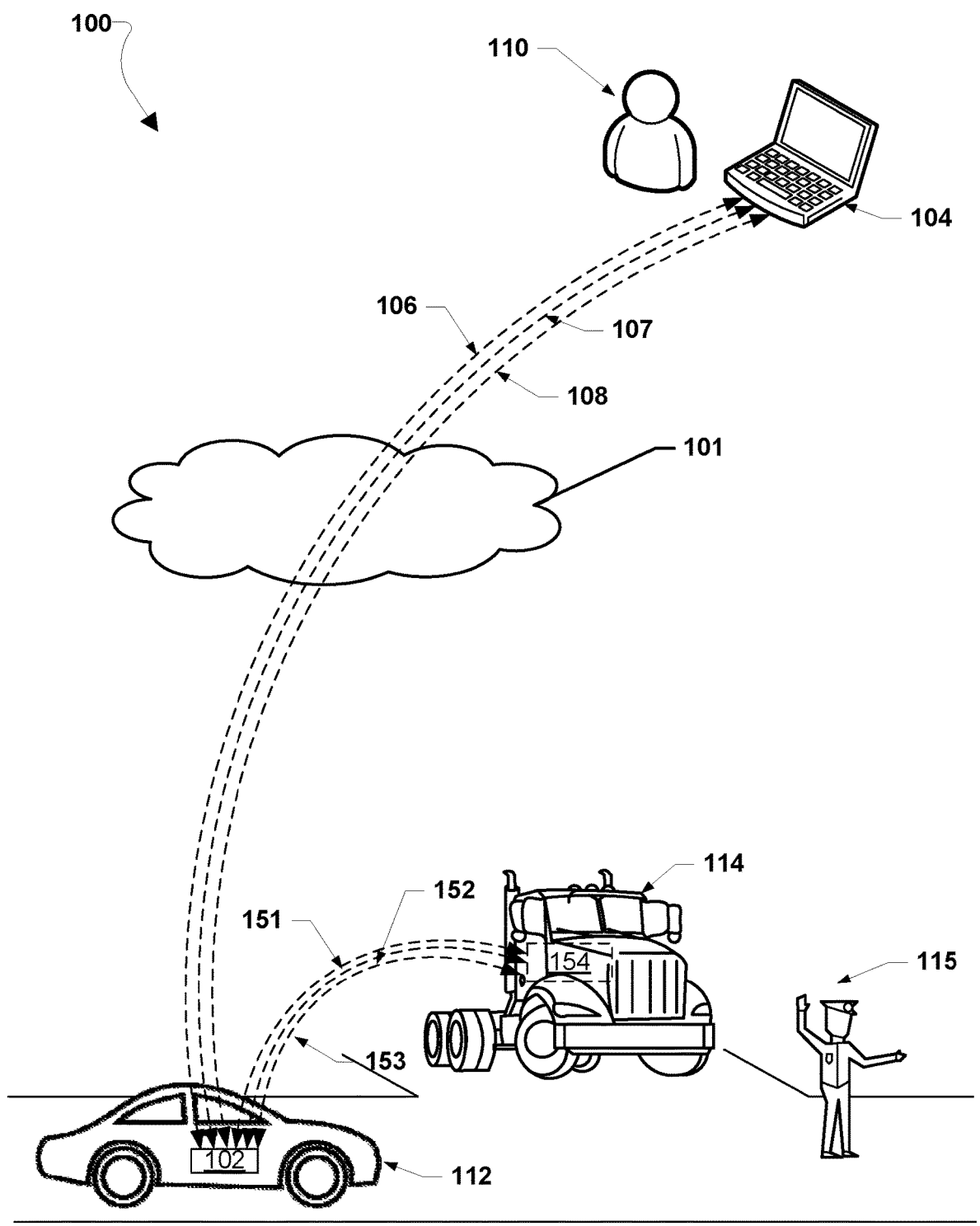
FIG. 1A is a system block diagram illustrating a network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU® or CHROMECAST® or FIRE TV™), smart televisions, digital video recorders (DVRs), and similar personal electronic devices which include a programmable processor and memory and circuitry for sending and/or receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

Vehicles, such as driverless cars, may include one or more systems, such as sensors, cameras, etc., that can generate data and/or can include one or more systems that can benefit from data received from devices remote from the vehicles, such as mapping systems, remote teleoperation systems, etc. The transport of the data generated by the vehicle and/or the data received by the vehicle over any given delivery path, such as a Long Term Evolution (LTE) pathway, Wi-Fi pathway, etc., may be limited by the capabilities (e.g., bandwidth, latency, reliability, cost, etc.) of that given delivery path. Thus, while transport of data to and from vehicles like driverless cars can be beneficial, current single path communication systems may not have the capabilities (e.g., bandwidth, latency, cost, reliability, etc.) in a single path to meet the needs for data transport of such vehicles under some circumstances.

One example of a scenario in which data transport is needed for autonomous and semi-autonomous vehicles, such as driverless cars, is remote teleoperation. Remote teleoperation of driverless cars, self-driving cars, or any other type of autonomous or semi-autonomous vehicle requires both the inputs received by the vehicle's control system to be provided to a computing device of the remote teleoperator and the commands from the remote teleoperator's computing device to be provided to the vehicle's control system in essentially real time (or near real time). Reliable and real time/near real time communications of data is required to enable a remote teleoperator successfully and safely navigate the vehicle through time-critical situations, such as a traffic control scenario, an accident situation, a vehicle malfunction condition, or any other type scenario or condition necessitating remote teleoperation of the vehicle. While limited remote teleoperation of vehicles can be beneficial, current communication systems may not meet the latency requirements or the reliability requirements to support safe teleoperation of a vehicle, particularly when several vehicles may be in the same situation (e.g., in a traffic accident situation).

Another example of a scenario in which reliable, near real time data transport is needed for vehicles, such as driverless cars, is car-to-car mapping. In car-to-car mapping, a vehicle may generate a local map (or picture) of vehicles and objects around the vehicle. For example, using LIDAR or RADAR, a computing device within the vehicle may generate a map of the space around the vehicle. The computing device within the vehicle may then share that map with other vehicles, such as other driverless cars, enabling such other vehicles can to the map to update and/or generate their own respective maps. While such map sharing can be beneficial, current communication systems do not meet the bandwidth requirements at a reasonable cost to support car-to-car mapping.

Further examples of scenarios in which reliable, near real time data transport is needed for vehicles, such as driverless cars, include: transport of on-vehicle sensor data, e.g., tachometers, accelerometers, etc., to remote vehicle diagnostic services; transport of vehicle camera images to other vehicles to alert such other vehicles of traffic patterns; and transport of sensor data or camera images to other vehicles or traffic monitoring services to report the status of traffic control equipment (e.g., whether a traffic light is green or red, whether a traffic light is working or disabled, the posted speed limit for a road as indicated by a highway sign, etc.). Scenarios in which reliable, near real time data transport is needed for vehicles, such as driverless cars, may be intermittent scenarios, such as scenarios that may have a limited duration (e.g., remote teleoperation, etc.) and/or ongoing scenarios, such as scenarios that are always occurring (e.g., do not end) during operation of the vehicle (e.g., transport of on-vehicle sensor data, etc.). While such data transport can be beneficial, current communication systems do not meet bandwidth, latency, reliability, and/or cost requirements to make such data transport worthwhile and/or effective.

Various embodiments may provide for multipath transport of Internet Protocol ("IP") packets by a computing device including a plurality of modems. Various embodiments may provide for multipath transport of IP packets by an in-vehicle computing device, such as vehicle's autonomous driving system, vehicle's telematics unit, vehicle's control system, etc. In various embodiments, one of a plurality of modems associated with a highest path preference may be set as a selected one of the plurality of modems and IP packets may be assigned to that selected one of the plurality of modems for transport. In this manner, a single path routing may be used for routing IP packets. Routing IP packets via a single path may reduce (e.g., minimize) re-ordering of packets on the receiver/destination side in comparison to routing IP packets via all available delivery paths.

In various embodiments, each modem of the plurality of modems may be assigned a relative priority. For example, one of the modems may be assigned a highest priority, one of the modems may be assigned a middle priority, and one of the modems may be assigned a lowest priority. Priority among the modems may be based on factors associated with the transport of packets via the modems. For example, a modem providing access to a lowest cost service provider network may be the highest priority modem and a modem providing access to a highest cost service provider network may be the lowest priority modem. Other attributes of the modems may enable prioritization among the modems, such as relative power requirements, relative capabilities, computing resource requirements, etc. In various embodiments, the path preferences between different delivery paths may correspond to the relative priorities between the modems. For example, a delivery path established by the highest priority modem may be the preferred delivery path for transport of IP packets.

In various embodiments, IP packets may be assigned to a selected one of a plurality of modems for transport based on available bandwidths. For example, a modem with the highest available bandwidth may be selected from the plurality of modems for transporting IP packets. In some embodiments, the available bandwidth may be the air interface estimated bandwidth as determined by each respective modem. In some embodiments, the available bandwidth may be the end-to-end bandwidth estimate of the delivery path associated with each respective modem.

The accuracy of bandwidth estimates, such as air interface bandwidth estimates, end-to-end bandwidth estimates, etc., may increase when packets are actually sent over the pathway. As time passes since a packet was last sent via a delivery path, an available bandwidth estimate for that path may become less and less accurate.

In various embodiments, in response to an available bandwidth of a selected one of the plurality of modems dropping below a quality threshold, IP packets may be assigned to all of the plurality of modems for transport for a switch period of time. In various embodiments, in response to the current selected modem not being the highest priority modem and a broadcast timer exceeding a broadcast time threshold, IP packets may be assigned to all of the plurality of modems for transport for a switch period of time. In various embodiments, the broadcast time threshold may be any period of time. For example, the broadcast time threshold may be less than fifty milliseconds, fifty milliseconds, fifty milliseconds to one hundred milliseconds, one hundred milliseconds, or more than one hundred milliseconds. By assigning packets to all of the plurality of modems for transport, packets may be broadcast by each of the plurality of modems. As packets are broadcast by each of the plurality of modems, the bandwidth estimate for each delivery path may be refreshed and the accuracy of the estimate increased.

In various embodiments, the switch period of time may be a period of time selected to enable packets to be set via the plurality of modems and a steady bandwidth estimate to be determined. The switch period of time may be any period of time. For example, the switch period may be less than one second, one second, one to two seconds, two seconds, or more than two seconds. Such periods of time may reduce volatility in the bandwidth estimate.

In response to the switch period of time expiring, a modem of the plurality of modems meeting a selection criterion may be selected as the one of the plurality of modems for transport. In various embodiments, the selection criterion may include one or more of path preferences, air interface available queue size estimates, air interface available bandwidth estimates, end-to-end bandwidth estimates, and end-to-end delay estimates. For example, the selection criterion may be to select the modem with the highest priority meeting a minimum bandwidth level (e.g., minimum air interface bandwidth estimate, minimum end-to-end bandwidth estimate, etc.). As another example, the selection criterion may be to pick the highest bandwidth modem (e.g., a modem with the largest air interface bandwidth estimate, largest end-to-end bandwidth estimate, etc.).

In various embodiments, different categories (or types) of traffic may be scheduled using different schedulers. For example, the Transmission Control Protocol (TCP) traffic may be scheduled using a scheduler configured to schedule traffic over a single selected path based at least in part on bandwidth estimates, bandwidth probing and one or more selection criteria as described above; and, at the same time, User Datagram Protocol (UDP) traffic may be scheduled using a different scheduler that may make scheduling decisions packet by packet and spreads the traffic over all interfaces at all times. As another example, UDP traffic may be scheduled using a scheduler configured to schedule traffic over a single selected path based at least in part on bandwidth estimates, bandwidth probing, and one or more selection criteria as described above; and, at the same time, TCP traffic may be scheduled using a different scheduler that makes scheduling decisions packet by packet and spreads the traffic over all interfaces at all times. In still other embodiments, both types of traffic (e.g., TCP traffic and UDP traffic) may use the same scheduler.

In various embodiments in which different categories (or types) of traffic may be scheduled by different schedulers and in response to an available bandwidth of the selected one of the plurality of modems dropping below the quality threshold and UDP packets being assigned to at least one of the plurality of modems, a modem of the plurality of modems meeting a selection criterion may be selected as the one of the plurality of modems for transport of TCP packets. The selection of one of the plurality of modems for transport of TCP packets when UDP packets are being assigned to at least one of the plurality of modems may allow selection of the one of the plurality of modems without the need for probing through a broadcast duration before re-selection. For example, the broadcast of packets for a certain duration may improve the accuracy of bandwidth estimates used to select the transmission path. As UDP packets may be assigned to modems for transport via different requirements than TCP packets, the bandwidth estimates for the modems may be accurate because UDP packets may have been recently transported by all the modems even though TCP packets may have been previously assigned to a single path. Thus, when UDP packets are being assigned to all modems, a switch period may not be required, and the modem meeting a selection criterion may be selected as the one of the plurality of modems for transport of all IP packets, both TCP and UDP packets.

In various embodiments, TCP packets and UDP packets may be assigned to one of a plurality of modems through path selection based on preferences and/or packet level scheduling based on local least-delay estimates. In various embodiments, TCP packets and UDP packets may be assigned to one of a plurality of modems based on different requirements or the same requirements. For example, TCP packets and UDP packets may both be routed based on local least-delay estimates. As another example, TCP packets and UDP packets may be both routed through path selection based on preferences. As a further example, TCP packets may be routed through path selection based on preferences and UDP packets may be routed through per packet path selection based on local least-delay estimates. As further examples, TCP packets and/or UDP packet routing may transition between path preference based routing and local least delay based routing.

In various embodiments, re-assignment of UDP packets to a new one of a plurality of modems based on local least delay criteria may be prevented when a local least-delay estimate for a previously used path of the plurality of modems is below a delay threshold. The delay threshold may be any threshold. For example, a delay threshold may be fifty milliseconds. A scheduler may keep track of the last path used for a connection identified by, for example, the source and destination IP addresses and ports, and may compare the delay estimate for that previous path to the delay threshold. The scheduler may keep packets of a same connection on a same path in response to determining that the delay threshold is not exceeded on that path. In this manner, the scheduler may override the distribution of packets when the local least-delay estimate for a previously used modem, which is one of the plurality of modems, is below a delay threshold. Additionally, the scheduler may hash the quintuple (source IP Address, source port, destination IP port, destination port, protocol of TCP or UDP) to a hash value that can be readily computed and then used to index the connections.

In various embodiments, a backend server may route traffic to a computing device including a plurality of modems via a selected one of the plurality of modems. For example, the backend server may route traffic to the modem associated with the path carrying TCP traffic. For example, the backend server may route traffic to the modem associated with the path having lowest path delay. For example, the backend server may route traffic to the modem associated with a path indicated by the computing device.

Various embodiments may provide a centralized scheduler for a computing device, such as an IP level scheduler for a computing device. In various embodiments, a scheduler running on a processor of a computing device, may allocate packets for IP streams for transport to a plurality of modems, such as two, three, four, or more modems. For example, the IP streams for transport may be IP streams (e.g., media streams) generated from applications and/or devices such as cameras, sensors (e.g., LIDAR, RADAR, accelerometers, tachometers, etc.), other systems, etc.

In various embodiments, the centralized scheduler, such as an IP level scheduler, may receive indications of per path statistics for delivery paths associated with each available modem. In various embodiments, a scheduler may receive per path statistics through the modem control (MC) (or modem notification (MN)) interface. In various embodiments, modems may provide their available rates, queue sizes, and air interface bandwidth estimates through the MC (or MN) interface. In some embodiments, these statistics may be combined with end-to-end feedback on link quality that supplements the local radio link information.

Various examples of different applications/clients, middleware, layers, stacks, radio technologies, and transport protocols are discussed herein, specifically, Internet Protocol (IP), Transmission Control Protocol (TCP), User Datagram Protocol (UDP), Long Term Evolution (LTE), cellular vehicle-to-everything (V2X), Wireless Gigabit (WiGig), and/or ANT. The discussions of IP, TCP, UDP, LTE, V2X, WiGih, and ANT are provided merely as examples to better illustrate the aspects of the various embodiments, and are not intended to limit the scope of the disclosure or the claims in any way. Other applications/clients, middleware, layers, stacks, radio technologies, and transport protocols may be used with the various embodiments, and the other applications/clients, middleware, layers, stacks, radio technologies, and transport protocols may be substituted in the various examples without departing from the spirit or scope of the invention.

FIG. 1A is a system block diagram illustrating a network 100, such as a remote teleoperator network for a vehicle 112, suitable for use with various embodiments. The vehicle 112 may be any type of vehicle, such as an autonomous vehicle (e.g., driverless car, etc.), semi-autonomous vehicle, remotely operated vehicle, etc. The vehicle 112 may be configured to be operated remotely for a period of time by a remote teleoperator 110 using his or her remote teleoperator computing device 104.

To support remote teleoperation, an in-vehicle computing device 102 in the vehicle 112 (e.g., an autonomous driving system, a telematics unit, a control system of the vehicle 112, etc.) may establish one or more different delivery communication paths 106, 107, and/or 108 through a delivery cloud between the in-vehicle computing device 102 and the remote teleoperator computing device 104. The different delivery communication paths 106, 107, 108 may be delivery paths established via distinct LTE connections established by different LTE modems, delivery paths established via distinct V2X connections established by different modems, etc. The different delivery communication paths 106, 107, and/or 108 may all be the same type and/or frequency band paths or may be an assortment of different types and/or frequency band paths. In some embodiments, the in-vehicle computing device 102 may be part of the autonomous driving system, telematics unit, control system, etc. of the vehicle 112. In some embodiments, the in-vehicle computing device 102 may be a separate computing device, such as a system-on-chip computing device, in communication with the autonomous driving system, telematics unit, control system, etc. of the vehicle 112.

Sensors, cameras, and other systems of the vehicle 112 may provide inputs to the in-vehicle computing device 102. As examples, LIDARs, RADARs, accelerometers, tachometers, forward cameras, rear-view cameras, side cameras, etc., may provide inputs to the in-vehicle computing device 102. The inputs may be received from direct connections to the sensors, cameras, and other systems, and/or may be received via connections to other communication networks, such as the controller area network (CAN) bus, etc. of the vehicle 112, or other devices such as an Ethernet connection to another on-vehicle 112 device. The inputs may have different time sensitivities. For example, some data may update rapidly and be time sensitive, such as video data, LIDAR data, audio data, etc. As an alternative example, some data may update relatively slowly, such as data received from the vehicle's CAN bus, such as temperature sensor data, odometer data, etc.

Via the one or more different delivery paths 106, 107, and/or 108 the in-vehicle computing device 102 may send the inputs from the sensors, cameras, and other systems of the vehicle 112 to the remote teleoperator computing device 104. The remote teleoperator 110 may use the inputs from the sensors, cameras, and other systems of the vehicle 112 to manually operate or otherwise guide the vehicle 112. Such manual operation of guidance to the vehicle may be accomplished by controlling a remote teleoperator computing device 104 to transmit one or more commands to the in-vehicle computing device 102 via the one or more different delivery paths 106, 107, and/or 108.

In the example of the operation of the network 100 illustrated in FIG. 1A, an autonomous vehicle 112 approaches an unmetered intersection in which a police officer 115 is directing traffic, such as a truck 114, to merge into the lane of the vehicle 112. Based on inputs from the vehicle's 112 sensors, cameras, and other systems, the in-vehicle computing device 102 (or other computing device of the vehicle) may determine that the current operating conditions exceeds the safe operating capabilities of the vehicle's autonomous driving system, and thus requires remote teleoperation of the vehicle 112. For example, the high variability and potential randomness in the operations of the police officer 115 and the truck 114 in the merging scenario may be such that the autonomous control algorithms may not be capable of ensuring safe control the vehicle 112 in the scenario. In response to determining that a scenario for remote teleoperation is occurring, the in-vehicle computing device 102 may establish one or more different delivery paths 106, 107, and/or 108 through the delivery cloud to enable remote teleoperation of the vehicle 112 by the remote teleoperator 110 via his or her remote teleoperator computing device 104. The vehicle 112 may then be navigated through the merging situation via remote teleoperation or remote guidance. Upon successful navigation through the situation, remote teleoperation of the vehicle 112 may end and control may be passed back to the vehicle's autonomous driving system.

Additionally, the vehicle 112 may establish data connections with other devices, such as other vehicles (e.g., truck 114) to send and/or receive data from those other vehicles. The computing device 102 in the vehicle 112 may establish one or more different delivery paths 151, 152, and/or 153 directly between the in-vehicle computing device 102 and the in-truck computing device 154. The delivery paths may be established via distinct LTE connections established by different LTE modems, delivery paths established via distinct Wi-Fi connections established by different Wi-Fi modems, delivery paths established via distinct V2X connections established by different V2X modems, delivery paths established via distinct WiGig connections established by different WiGig modems, delivery paths established via distinct ANT connections established by different ANT modems, delivery paths establish via a combination of LTE, Wi-Fi, WiGig, ANT, and/or V2X modems, etc. The delivery paths 151, 152, and/or 153 may all be the same type and/or frequency band paths, or may be an assortment of different type and/or frequency band paths. In some embodiments, the in-truck computing device 154 may be part of the autonomous driving system, telematics unit, control system, etc. of the truck 114. In some embodiments, the in-truck computing device 154 may be a separate computing device, such as a system-on-chip computing device, in communication with the autonomous driving system, telematics unit, control system, etc. of the truck 114. Sensors, cameras, and other systems of the truck 114 may provide inputs to the in-truck computing device 154. As examples, LIDARs, RADARs, accelerometers, tachometers, forward cameras, rear-view cameras, side cameras, etc., may provide inputs to the in-truck computing device 154. The inputs may be received from direct connections to the sensors, cameras, and other systems, and/or may be received via connections to other communication networks, such as the truck's CAN bus, etc., or other devices, e.g., an Ethernet connection to another on truck 114 device. Via the one or more different delivery paths 151, 152, and/or 153 the in-vehicle computing device 102 and the in-truck computing device 154 may exchange their respective inputs from the sensors, cameras, and other systems. As an example of the transport of data exchanged between the truck 114 and the vehicle 112 via the one or more different delivery paths 151, 152, and/or 153, the vehicle 112 and truck 114 may exchange map data in a car-to-car mapping process. As another example, the vehicle 112 may send the truck 114 camera data of the police officer 115 to enable the truck 114 to better maneuver through the traffic scenario based on the camera data from the vehicle 112.

Figure 1B:
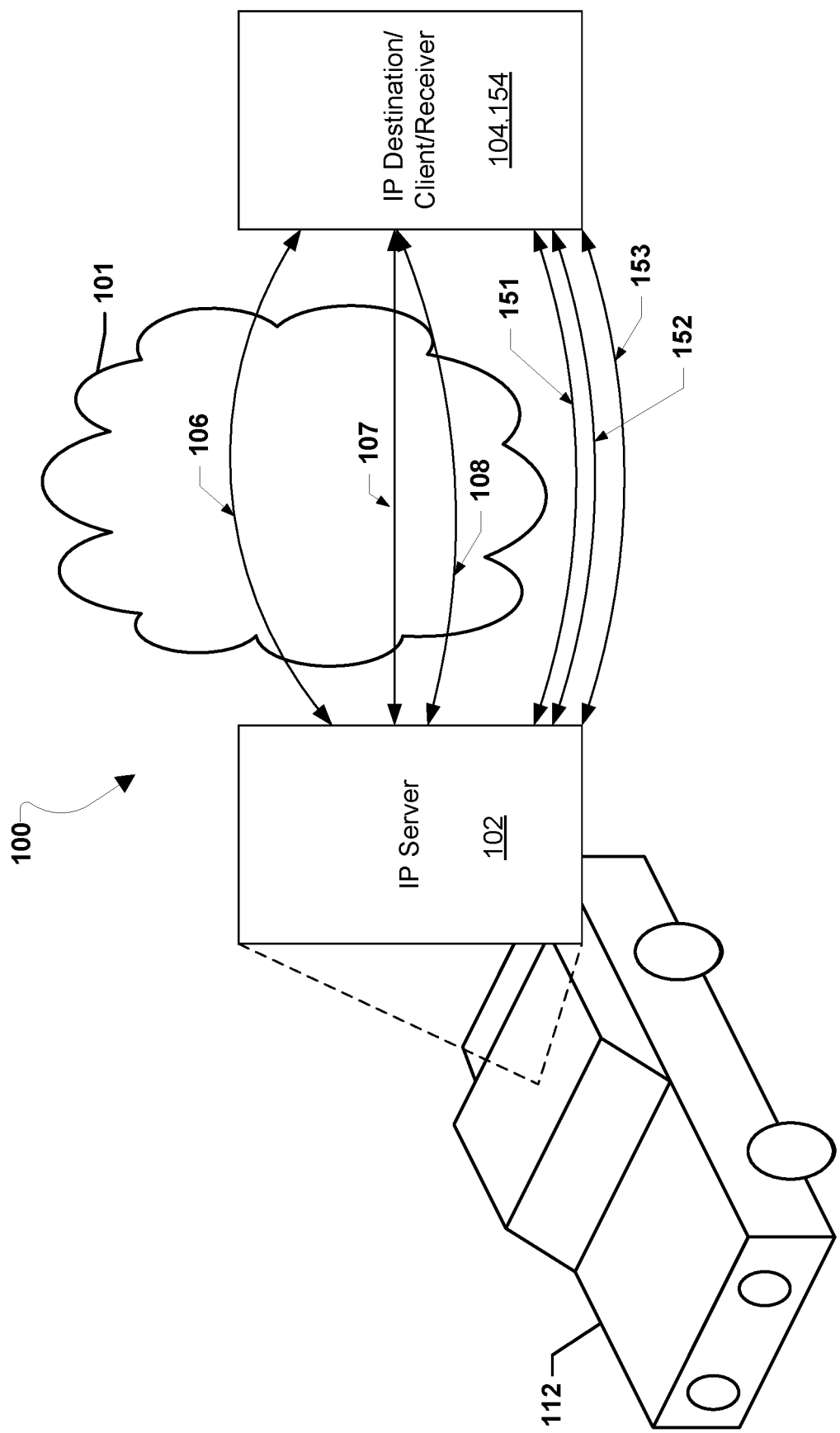
FIG. 1B is a communication system block diagram of a network suitable for use with various embodiments.

FIG. 1B illustrates further aspects of the network 100 suitable for use with various embodiments. As described with reference to FIG. 1A, the network 100 may include two computing devices 102, 104/154 configured to communicate with one another via IP transport sessions. At a given time in any IP transport session, one computing device (e.g., 102) may be the computing device sending IP flows to the other computing device (e.g., remote teleoperator computing device 104, in-truck computing device 154, etc.) which may receive one or more of the IP flows via different delivery paths 106, 107, and/or 108 established via a delivery cloud 101 (e.g., the Internet, LTE networks, V2X networks, etc.) and/or different delivery paths 151, 152, and/or 153 established directly, between the two computing devices 102, 104/154. The computing device (e.g., 102) sending the IP flows may be referred to as the source computing device or server. The computing device (e.g., 104/154) receiving the IP flows may be referred to as the destination computing device, client, or receiver. The different delivery paths 106, 107, and/or 108 may each be separate delivery paths through the delivery cloud 101 (e.g., delivery paths established via distinct LTE connections established by different LTE modems, delivery paths established via distinct V2X connections established by different V2X modems, etc.) and/or different delivery paths 151, 152, and/or 153 established directly and the different delivery paths may be routed from distinct Internet Protocol (IP) addresses of the computing device sending the IP flows, such as in-vehicle computing device 102, to one or more IP addresses of the computing device receiving the IP subflows, such as remote teleoperator computing device 104, in-truck computing device 154, etc. For example, each different delivery path 106, 107, and/or 108 may be a respective Virtual Private Network (VPN) tunnel established via a separate modem of the computing device 102. While three delivery paths 106, 107, and 108 are illustrated in FIG. 1, more than three delivery paths may be provided by the computing device sending the IP flows, such as computing device 102, to an IP address of the computing device receiving the IP flows, such as computing device 104. For example, a separate delivery path may be established for each separate modem available on the computing device sending the IP flows, such as computing device 102.

In various embodiments, each IP stream sent over the different delivery paths 106, 107, 108, 151, 152, and/or 153 may be the same. As such, should any one delivery path experience a failure, another delivery path may still provide the same IP stream, thereby providing redundancy and improved quality of service. For example, each IP stream may be the same IP stream sent over the different delivery paths 106, 107, 108, 151, 152, and/or 153. In various embodiments, the IP streams may enable a receiver to recover the original IP stream. In various embodiments, delivery paths 106, 107, 108, 151, 152, and/or 153 may be assigned different priorities, such as one delivery path (e.g., 106, 107, 108, 151, 152, or 153) may be prioritized over the other delivery paths (e.g., 106, 107, 108, 151, 152, or 153). Delivery paths 106, 107, 108, 151, 152, and/or 153 may be prioritized relative to one another based on one or more path attributes associated with the delivery paths 106, 107, 108, 151, 152, and/or 153, such as cost, bandwidth, quality-of-service (QoS), transmission delay, transmission queue size, transmission rate, indications from an end point (e.g., remote teleoperator computing device 104 or in-truck computing device 154 indicating a preferred path), etc. In various embodiments, each IP stream sent over the different delivery paths 106, 107, 108, 151, 152, and/or 153 may be different.

Figure 2:
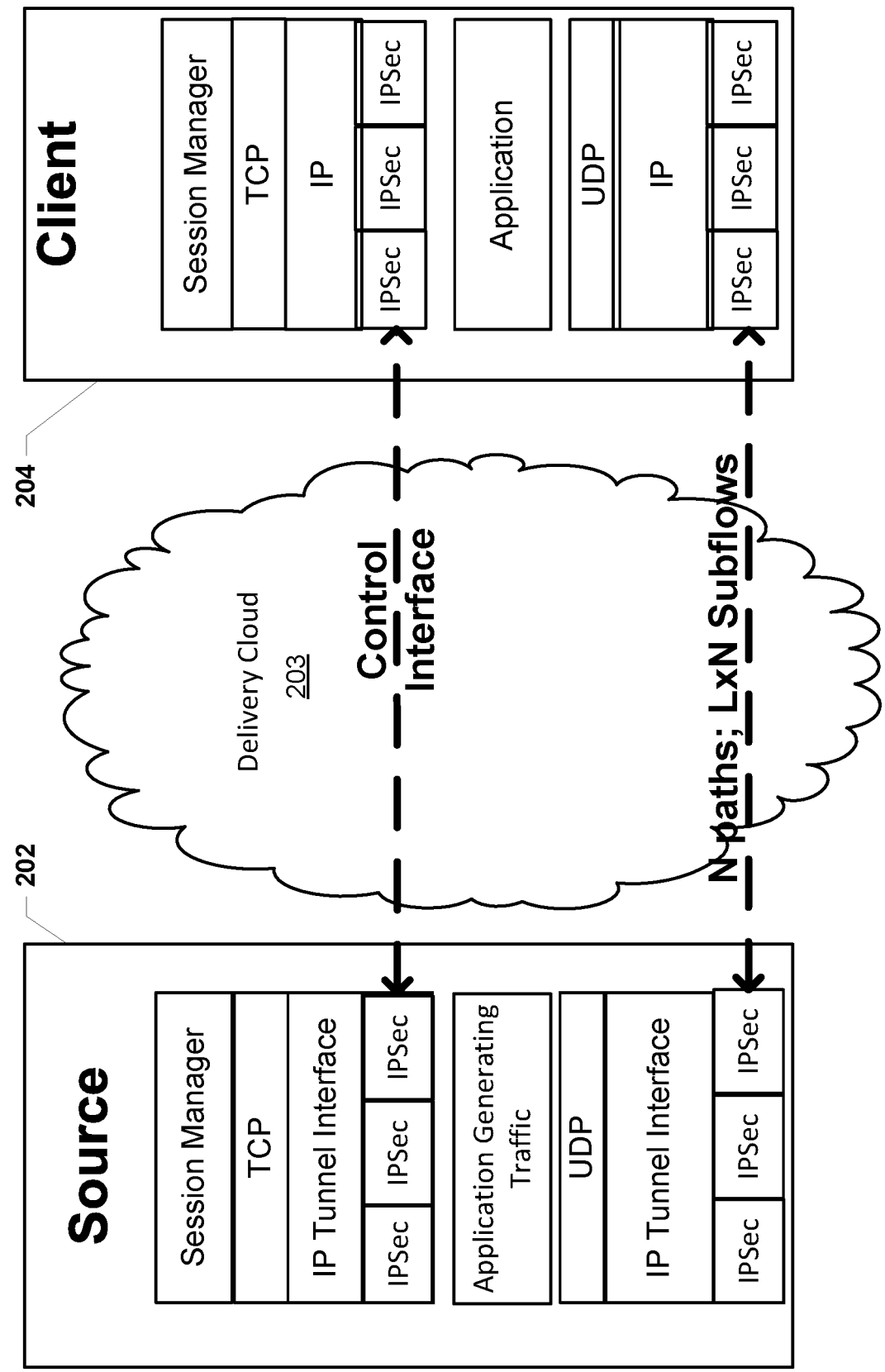
FIG. 2 is a system block diagram illustrating relationships between network elements and the computing device layers (or stacks) in a network according to various embodiments.

FIG. 2 illustrates relationships between a source 202 and a client 204 in a network according to various embodiments. The source 202 may include an application (and/or device, such as cameras or sensors (e.g., LIDAR, RADAR, accelerometers, tachometers, etc.), other systems, etc.) generating traffic for transmission to the client 204. For example, the traffic may be one or more streams of IP packets (e.g., TCP packets, UDP packets, etc.) for transmission to the client 204. The application and/or device may output the IP stream to a UDP stack (or layer), an IP tunnel interface, and IP security layers. The stream of IP packets may be spread over "N" number of streams (e.g., three streams as illustrated, four streams, more than four streams, etc.), such that each stream may include inputs from the "L" separate subflows. The "N" streams may be sent via respective Virtual Private Network (VPN) tunnels established via the respective modems for transmission via respective IP addresses to the IP address of the client 204 over the delivery cloud 203 (e.g., the Internet, LTE networks, V2X networks, etc.) Each stream may be sent over its own delivery path, such that "N" different delivery paths may each provide "L" subflows to the IP address of each client 204 in the delivery session.

In various embodiments, security may be applied to the IP streams on a per stream basis by IP security layers at the modems, such that each VPN is established using separate IP security. Each VPN established by the modems may have its own assigned IP address, and each VPN's IP address may be part of the same subnet.

The delivery session between the source 202 and the client 204 may be managed by a session manager on the source 202. The session manager may operate as an IP level scheduler for controlling the assignment of IP packets to the modems of the source 202. Session control information may be exchanged between the source 202 and the client 204 via any pathway, such as a dedicated control channel between one or more IP addresses of the source 202 and an IP address of the client 204, one of the "N" different delivery paths used for the transport of the streams, or any other delivery mechanism. The session control information may indicate various information including the number of streams, a media description including application configuration and IP packet information, bandwidth, IP address and port information to receive the streams and their corresponding control packets, etc. The session control information may indicate IP security contexts for the IP transport session, such as encryption and authentication keys, for the IP subflows.

The client 204 may receive the IP subflows sent via the "N" different delivery paths. In the opposite manner of the IP source 202, the client 204 may pass the received IP packets of the streams via an IP stack (or layer), UDP stack (or layer), and application stack (or layer). The application may decode the packets to produce the original generated traffic for further use by the client 204. For example, the client 204 may be a backend server that may store the original generated traffic. As a specific example, the original generated traffic may be media packets and the application at the client 204 may decode, store, and otherwise consume the media packets. As another example, the client 204 may be a backend server that may store original "L" camera inputs for use by a remote teleoperator. As another example, the client 204 may be the remote teleoperator computing device 104 and the remote teleoperator computing device 104 may output the original "L" camera (or sensor, other system, etc.) inputs to the remote teleoperator 110 to enable the remote teleoperator 110 to control the vehicle 112.

In various embodiments, the client 204 may route traffic to the source 202 via a selected one of a plurality of modems. For example, the client 204 may route traffic to the modem associated with the path carrying TCP traffic. For example, the client 204 may route traffic to the modem associated with the path having lowest path delay. For example, the client 204 may route traffic to the modem associated with a path indicted by source 202.

Figure 3:
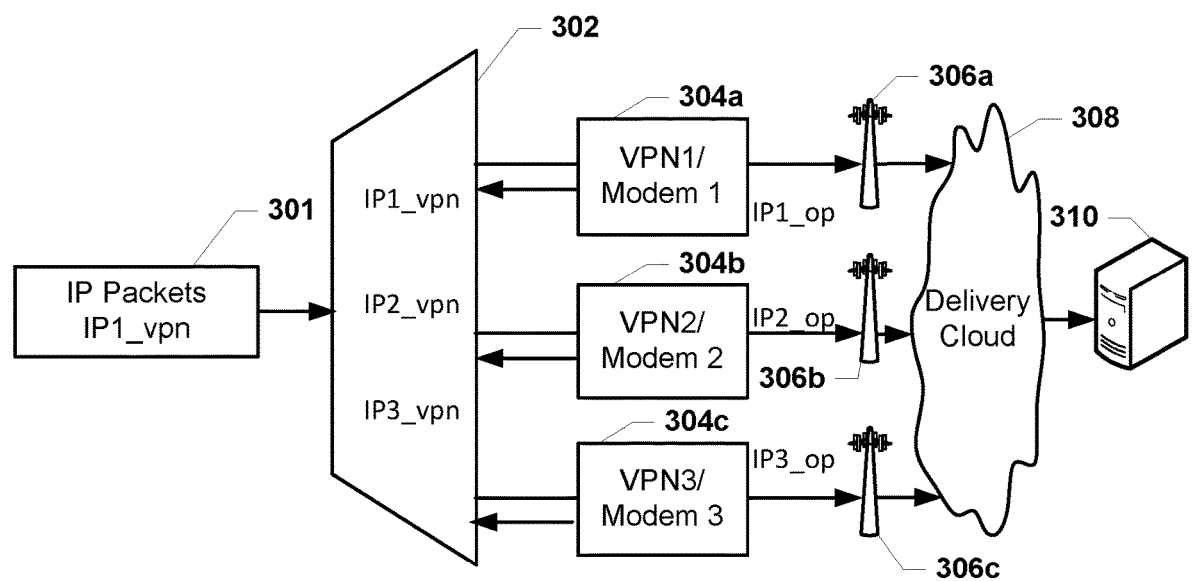
FIG. 3 is a system block diagram of an IP level scheduler of media streams within a source computing device according to various embodiments.

FIG. 3 illustrates an IP level scheduler 302 of media streams within a source computing device. Each modem 304a, 304b, 304c may periodically provide to the scheduler 302 the observed bit rate and the queue size on its modem control (MC) interface. Each modem 304a, 304b, 304c, may provide an available bandwidth estimate for its respective air interface. In various embodiments, feedback from sender and/or receiver reports may provide overall end-to-end statistics. Feedback provided may enable end-to-end statistics to be determined by the IP level scheduler 302 on a per-path basis, such as end-to-end bandwidth estimates for each path. In various embodiments, each modem 304a, 304b, 304c, may be assigned a relative priority. For example, one of the modems may be assigned a highest priority, one of the modems may be assigned a middle priority, and one of the modems may be assigned a lowest priority. Priority among the modems may be based on factors associated with the transport of packets via the modems. For example, a modem providing access to a lowest cost service provider network may be the highest priority modem and a modem providing access to a highest cost service provider network may be the lowest priority modem. Other attributes of the modems may enable prioritization among the modems, such as relative power requirements, relative capabilities, etc. In various embodiments, the path preferences between different delivery paths may correspond to the relative priorities between the modems. For example, a delivery path established by the highest priority modem may be the preferred delivery path for transport of IP packets. In various embodiments, the received statistics, such as end-to-end bandwidth estimates, air interface available bandwidth estimates, etc., and the path preferences may be used individually, or in combination, compared to selection criterion, and based on the results of the comparison, the scheduler 302 may distribute IP packets onto the available interfaces.

As illustrated in FIG. 3, IP packets 301 received at the scheduler 302 may be sent on to the modems 304a, 304b, 304c. The IP level scheduler 302 may receive IP packets at a single IP address, such as an IP address denoted by "IP1_vpn." Each modem may have its own respective IP address assigned, such as the IP address denoted by "IP1_vpn", "IP2_vpn", and "IP3_vpn." The single IP address of the IP level scheduler 102 may be the same as an IP address of one of the modems, or may be a different IP address. The single IP address of the IP level scheduler 102 and the IP addresses of the modems 304a, 304b, 304c may all be of the same subnet. Each modem may communicate with a different operator network 306a, 306b, 306c, such as eNode B's of different service provider run LTE networks. The different operator networks 306a, 306b, 306c may be networks of the same type and frequency band, or may be networks of an assortment of different types and frequency bands. The operator networks 306a, 306b, 306c may form pathways through the delivery cloud 308 to provide the IP streams to the IP destination device 310, such as a server. The pathways may be separate VPNs. The IP streams may arrive at a resequencing buffer of the IP destination device 310 and be output for consumption (e.g., playback, etc.) at the IP destination device 310. In various embodiments, the scheduler 302 may assign packets for transport to one of the modems 304a, 304b, 304c, such that packets are routed to a single interface "IP1_vpn", "IP2_vpn", or "IP3_vpn". The routing of packets to a single interface may minimize re-ordering at the receiver side. In various embodiments, the scheduler 302 may assign packets for transport to all of the modems 304a, 304b, 304c such that packets are routed to all interfaces "IP1_vpn", "IP2_vpn", and "IP3_vpn." For example, the scheduler 302 may assign packets for transport to all of the modems 304a, 304b, 304c, in response to an available bandwidth of a selected one of the modems 304a, 304b, 304c dropping below a quality threshold.

Figure 4:
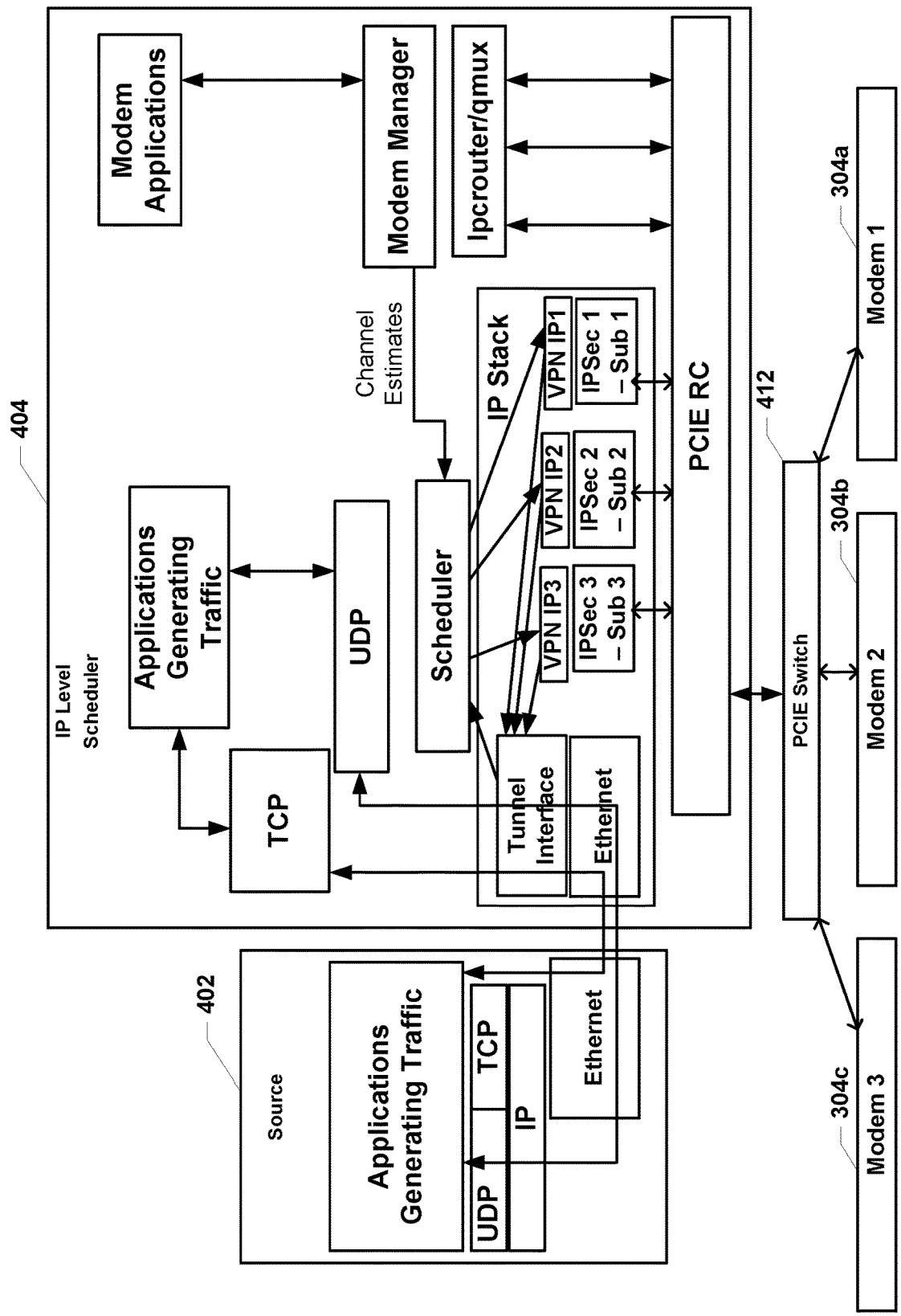
FIG. 4 is a system block diagram illustrating relationships between network elements and the computing device layers (or stacks) in a network according to various embodiments.

FIG. 4 illustrates example relationships between a source computing device 402 and an IP level scheduler 404 in a network according to various embodiments. The IP level scheduler 404 may be similar to the IP level scheduler 302 described above with reference to FIG. 3. The IP level scheduler 404 may include one or more applications generating/receiving IP traffic which may output IP streams to TCP and UDP stacks (or layers). In various embodiments, the IP level scheduler 404 and source device 402 may be components of the same device and/or system.

The source computing device 402 may connect to the IP level scheduler 404 using a local Ethernet connection. The Ethernet connection may handle session control signaling between the source computing device 402 and the IP level scheduler 404. The Ethernet connection may also provide the outputs of applications and/or devices generating traffic as IP streams to the IP stack (or layer) of the IP level scheduler 404. In various embodiments, an application on the source computing device 402 may establish and maintain a control connection to the IP level scheduler 404.

The IP level scheduler 404 may connect to 3 modems 304a, 304b, 304c via a Peripheral Component Interconnect Express (PCIE) switch 412. In some embodiments, some or all of the modems 304a, 304b, 304c could be with the same carrier. In some embodiments, each modem 304a, 304b, 304c may have its own subscription with a different service provider. For example, each modem 304a, 304b, 304c may be a different LTE modem establishing a different connection with a different carrier network. As another example, each modem 304a, 304b, 304c may be a different V2X modem. Costs, bandwidths, and QoS for each service provider and/or carrier network may be the same or different. Additionally, the capabilities of each modem 304a, 304b, 304c may be the same or different. The modems 304a, 304b, 304c may be the same type of modem operating in the same frequency bands or may be an assortment of different types of modems operating in different frequency bands. The modem manager may support multiple modems, and the connection manager may provide basic control to modem applications for accessing and managing the modems 304a, 304b, 304c. The modem manager interface may provide further functionality for accessing modem controls and information. For example, the uplink reporting of the available delivery rates on the modems (e.g., a MC (or MN) interface) may be available on the modem manager interface. A scheduler of the IP level scheduler 404 may schedule IP packets for the streams to the modems 304a, 304b, 304c. In various embodiments, the scheduler may be part of the IP stack of the IP level scheduler 404. In various embodiments, the scheduler may be a standalone application interfacing with other stacks (or layers) of the IP level scheduler 404, such as the IP stack (or layer), TCP stack (or layer), modem manager, and/or modem applications, etc.

IPSec tunnels, IPSec1, IPSec2 and IPSec3 may be established to the backend IP client (e.g., a backend server). In this manner, multiple virtual interfaces, each using its own VPN IP address VPN IP1, VPN IP2, and VPN IP3, may be established. IPSec header and trailer overhead may be taken into account when establishing the interfaces. The IP level scheduler 404 may establish and maintain a control connection to the backend IP client (e.g., a backend server).

The IP level scheduler 404 may deliver the IP streams to the IP client (e.g., a backend server). The IP streams may be delivered using one or more of the three paths established by the modems 304a, 304b, 304c. The IP level scheduler 404 may prefer one path over other paths due to possibly favorable terms from the corresponding operator. In some embodiments, the IP level scheduler 404 may establish all single-path communications over the interface associated with the preferred operator. Any artificial favoring of one interface may increase the delay in the system. However, the packet scheduling algorithms of the various embodiments may route the traffic to the queues that hold less data. In this manner, competing TCP traffic may be given a chance to get through because the scheduler will divert IP traffic to queues with less occupancy and delay. Thus, the queue serving TCP may be avoided by the IP scheduler due to the additional queue size caused by TCP. In various embodiments, the IP stack (or layer) may provide rate control feedback. For example, the IP stack (or layer) may compare an aggregate available rate to aggregate source rates. The IP stack (or layer) may provide a suggested transmit rate per source whenever needed.

Figure 5:
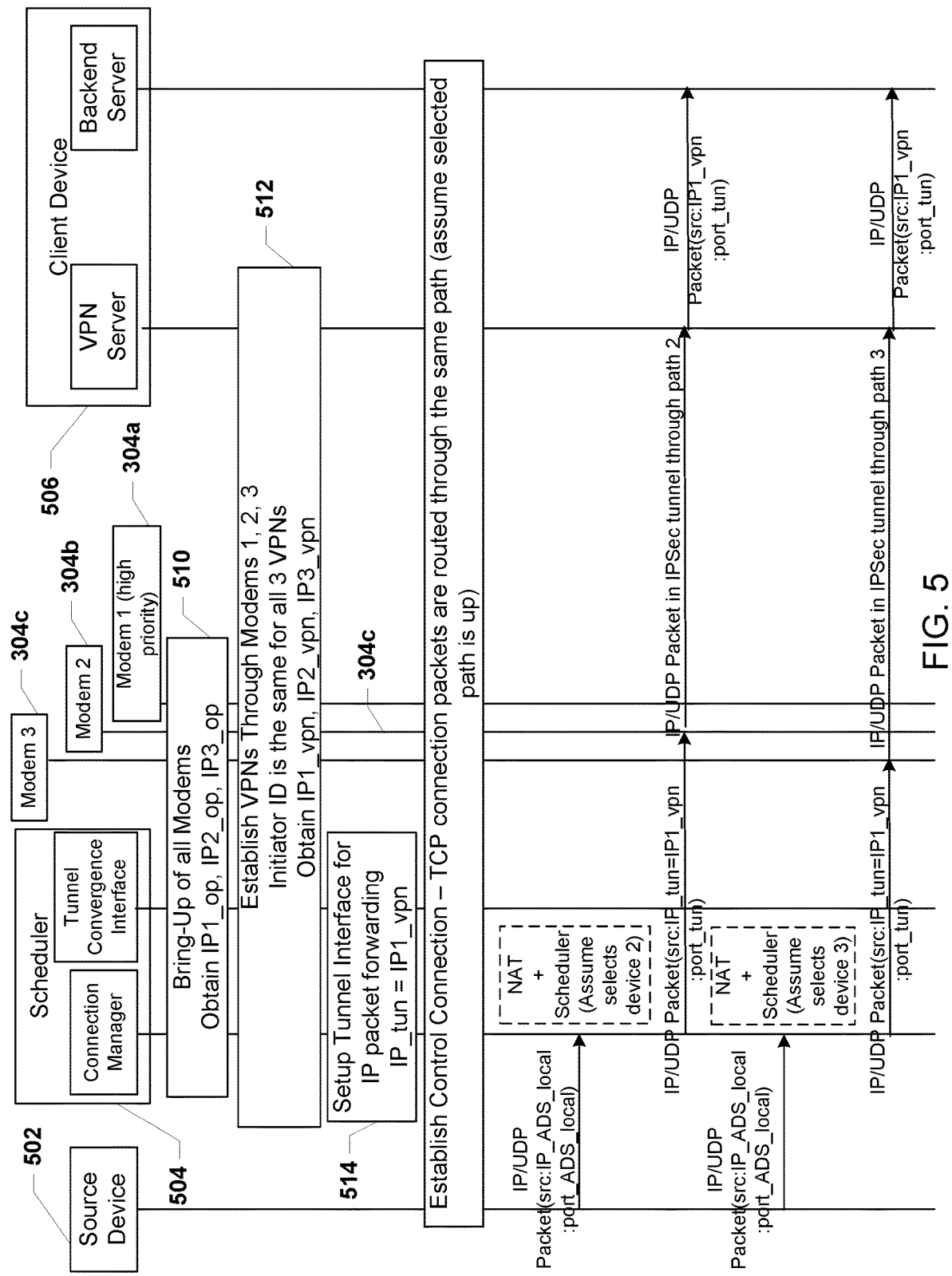
FIG. 5 is a call flow diagram illustrating interactions between an IP level scheduler and client computing device to establish an IP transport session according to an embodiment.

FIG. 5 is a call flow diagram illustrating interactions between an IP level scheduler 504 and destination (or client) computing device 506 to establish an IP transport session according to an embodiment. In various embodiments, the IP level scheduler 504 may be similar to schedulers 302 and 404 described above and the client device 506 may be similar to client devices 104 and 204 described above. For example, the interactions illustrated in FIG. 5 may be used to establish a session for application and/or device traffic, such as IP streams (e.g., streams from cameras, sensors (e.g., LIDAR, RADAR, accelerometers, tachometers, etc.), other systems, etc.).

Initially the scheduler 504 may bring up all modems and obtain IP addresses for the modems in block 510. In block 512, the scheduler 504 may establish VPNs through the modems 304a, 304b, 304c to a VPN server of the client device 506. The initiator ID may be the same for all VPNs and the scheduler 504 may obtain the IP addresses of the three VPNs.

In block 514, the scheduler 504 may set up a tunnel interface for IP packet forwarding. The tunnel interface may be a single IP address at the scheduler 504 to which all IP packets for transport to the client device 506 (e.g., IP packets from applications/devices) may be sent. The single IP address and the VPN addresses may be in the same subnet. For example, the single IP address may be the same IP address as the IP address of one of the VPNs. IP packets for transport to the client device 506, such as IP packets from the source device 502 or other cameras (or sensors), may arrive at the single IP address of the scheduler and be assigned to VPN paths of the modems 304a, 304b, 304c for transport by the selected path to the VPN server of the client device 506. The IP packets may then be passed from the VPN server to the backend server of the client device 506 for consumption at the client device 506. In another embodiment, the IP packets may be tunneled over UDP/IP datagrams within the IPSec tunnels. This may result in IP within IP within IP tunneling leading to a simpler UDP socket based implementation. The IP within IP within IP tunneling may involve higher overhead.

Figure 6:
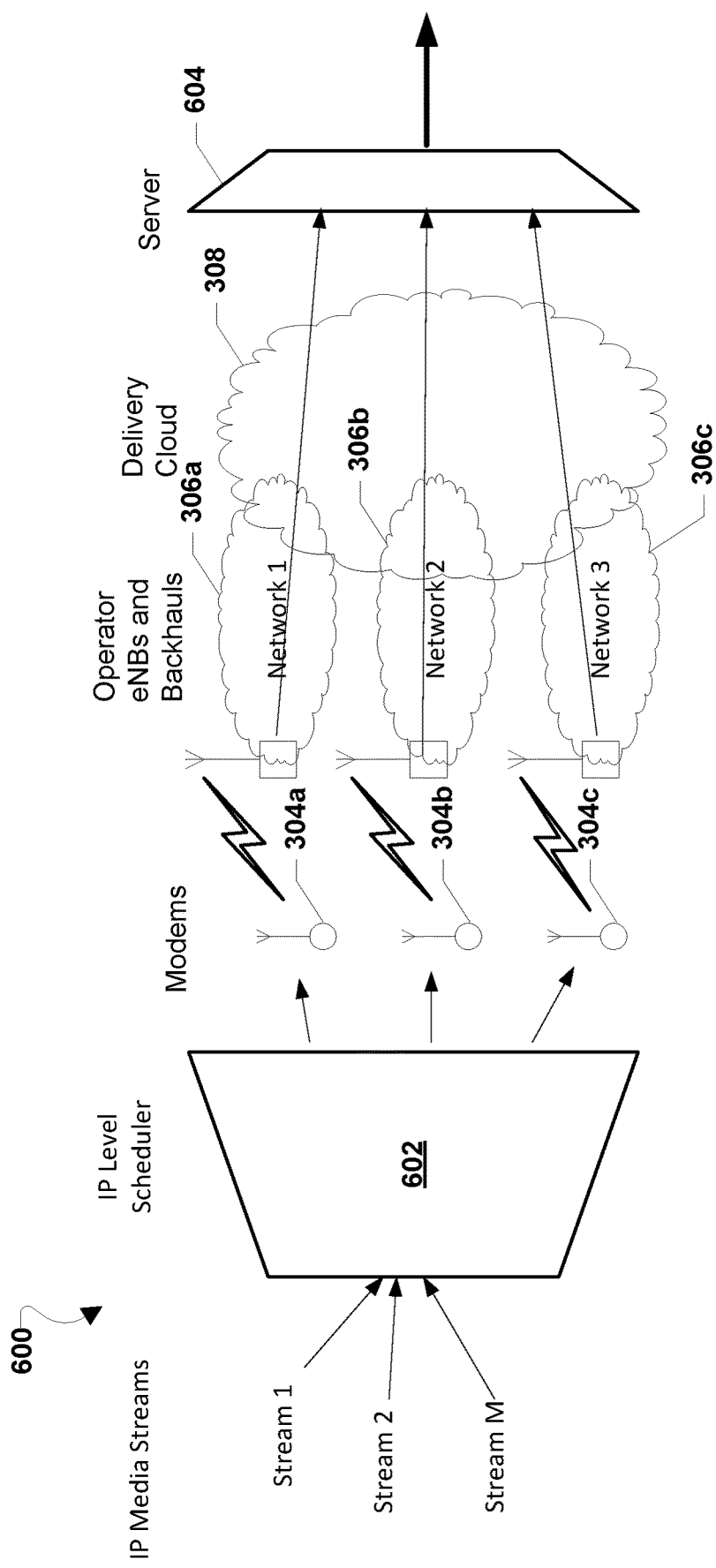
FIG. 6 illustrates a delivery chain of media streams within an IP level scheduler according to various embodiments.

FIG. 6 illustrates a delivery chain 600 of media streams within an IP level scheduler 602, such as IP level schedulers 302, 404, and 504 described above. Each modem 304a, 304b, 304c may periodically provide the observed bit rate, the queue size, and/or its air interface available bandwidth estimate on its modem control (MC) interface to the IP level scheduler 602.

In various embodiments, end-to-end statistics may be provided for each delivery path established through the modems 304a, 304b, 304c, the networks 306a, 306b, 306c, and the delivery cloud 308, to the server 310. Feedback from the client devices, such as receiver reports included in tracker information, may provide per path end-to-end statistics. Based on the received statistics, the IP level scheduler 602 may distribute IP packets onto subflows on the available interfaces. As illustrated in FIG. 6, IP media streams 1 through M may be sent to the scheduler 602 and on to the modems 304a, 304b, 304c. Each modem 304a, 304b, 304c may communicate with a different operator network (e.g., Network 1, Network 2, Network 3), such as eNode B's of different service provider run LTE networks. The operator networks 306a, 306b, 306c may form pathways, such as VPNs, through the delivery cloud 308 to provide the IP streams to the destination device 310, such as a server 604. The IP streams may arrive at a server 604 (e.g., the destination device) and be output for consumption (e.g., playback) at the destination device.

Figure 7:
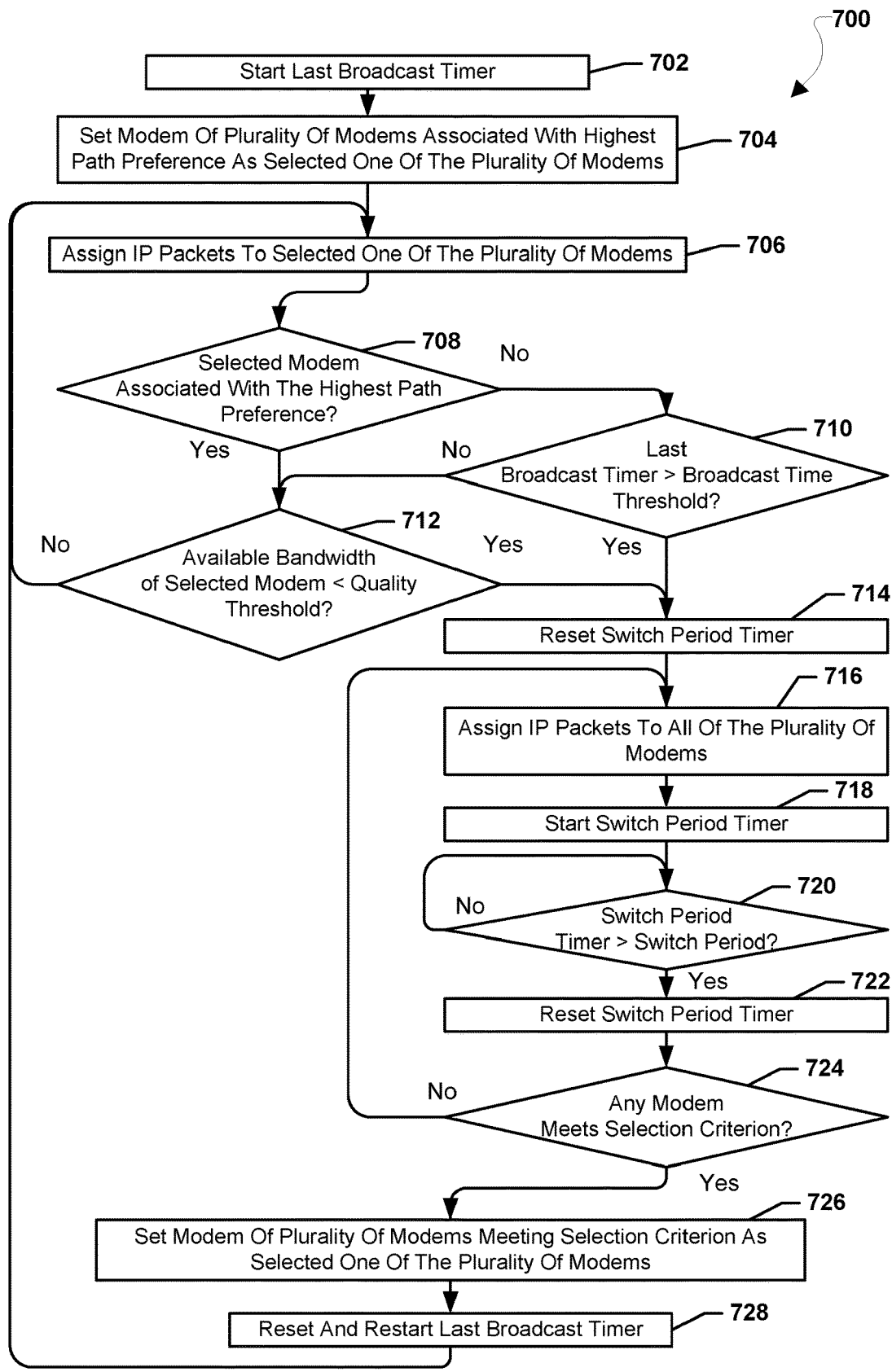
FIG. 7 is a process flow diagram illustrating an embodiment method for assigning packets to a selected one of a plurality of modems for transport.

FIG. 7 illustrates an embodiment method 700 for assigning packets to a selected one of a plurality of modems for transport. The method 700 may enable routing of packets based on path selection based on preferences. In various embodiments, the operations of method 700 may be performed by a scheduler running on a processor of a computing device, such as IP level schedulers 302, 404, 504, and 602 described above.

In block 702 the scheduler may start a last broadcast timer. In various embodiments, the last broadcast timer may be a timer tracking the time elapsed since IP packets were assigned to all of a plurality of modems, such as modems 304a, 304b, 304c described above. The time elapsed since IP packets were assigned to all of a plurality of modems may indicate the accuracy of bandwidth estimates for modems that have not been assigned packets for transport since the last broadcast timer was started. The accuracy of bandwidth estimates, such as air interface bandwidth estimates, end-to-end bandwidth estimates, etc., may increase when packets are actually sent over the pathway. As time passes since a packet was last sent via a delivery path, an available bandwidth estimate for that path may become less and less accurate. In this manner, the elapsed time tracked by the last broadcast timer may indicate the expected accuracy of an available bandwidth estimate associated with a modem. Additionally, the last broadcast timer may be used to initiate periodic broadcasts so that all paths may be periodically probed to check whether a switch to a higher priority path may be warranted.

In block 704 the scheduler may set a modem of the plurality of modems associated with a highest path preference as a selected one of the plurality of modems. For example, the default path may be the path with the highest path preference which may be associated with the highest priority modem. In various embodiments, the path preferences between different delivery paths may correspond to the relative priorities between the modems. For example, a delivery path established by the highest priority modem may be the preferred delivery path for transport of IP packets. In various embodiments, each modem may be assigned a relative priority. For example, one of the modems may be assigned a highest priority, one of the modems may be assigned a middle priority, and one of the modems may be assigned a lowest priority. Priority among the modems may be based on factors associated with the transport of packets via the modems. For example, a modem providing access to a lowest cost service provider network may be the highest priority modem and a modem providing access to a highest cost service provider network may be the lowest priority modem. Other attributes of the modems may enable prioritization among the modems, such as relative power requirements, relative capabilities, relative computing resource requirements, etc. In various embodiments, the path preferences between different delivery paths may correspond to the relative priorities between the modems. For example, a delivery path established by the highest priority modem may be the preferred delivery path for transport of IP packets. In various embodiments, the modem priorities and/or path preferences may be pre-configured for the computing device and/or user selectable.

In block 706 the scheduler may assign IP packets (e.g., TCP packets, UDP packets, etc.) to the selected one of the plurality of modems. In this manner, IP packets may be routed from the scheduler to one of the plurality of modems and a single delivery path may be used for transport of the IP packets from the source computing device to a destination computing device. As IP packets may only be assigned to the one selected modem for transport, the other unselected modems may not receive IP packets for transport. In various embodiments, the assignment of IP packets may be made on a packet type basis. For example, TCP packets may be assigned to one of the plurality of modems while UDP packets may be assigned to all of the plurality of modems.

In determination block 708 the scheduler may determine whether the selected modem is associated with the highest path preference. For example, the scheduler may compare the path preference for the current selected modem to the path preferences of any un-selected modems to determine whether the selected modem is associated with the highest path preference.

In response to determining that the selected modem is associated with the highest path preference (i.e., determination block 708="Yes"), the scheduler may determine whether the available bandwidth of the selected modem is less than a quality threshold in determination block 712. In various embodiments, the quality threshold may be a bandwidth level that is pre-configured for the computing device and/or user selectable. In some embodiments, the available bandwidth of the selected modem may be the air interface estimated bandwidth as determined by the modem itself and reported to the scheduler. In some embodiments, the available bandwidth may be the end-to-end bandwidth estimate of the delivery path associated with the selected modem as determined by the scheduler, for example based on sender and receiver reports.

In response to the available bandwidth of the selected modem being greater than or equal to the quality threshold (i.e., determination block 712="No"), the scheduler may assign IP packets to the selected one of the plurality of modems in block 706.

In response to determining that the selected modem is not associated with the highest path preference (i.e., determination block 708="No"), the scheduler may determine whether the last broadcast timer is greater than a broadcast time threshold in determination block 710. In various embodiments, the broadcast time threshold may be any period of time. For example, the broadcast time threshold may be less than fifty milliseconds, fifty milliseconds, fifty milliseconds to one hundred milliseconds, one hundred milliseconds, or more than one hundred milliseconds. The comparison of the last broadcast timer to the broadcast time threshold may enable periodic attempts at switching to the most preferred delivery path.

In response to determining that the broadcast time threshold has not expired (i.e., determination block 710="No"), the scheduler may determine whether the available bandwidth of the selected modem is less than a quality threshold in determination block 712.

In response to determining that the broadcast time threshold is exceeded (i.e., determination block 710="Yes") or in response to the available bandwidth of the selected modem dropping below the quality threshold (i.e., determination block 712="Yes"), the scheduler may reset a switch period timer in block 714. The switch period timer may be a timer tracking a time period associated with attempting to switch from path delivery of packets via a current selected modem to a new selected modem.

In block 716 the scheduler may assign IP packets to all of the plurality of modems. In this manner, IP packets may be routed to all of the plurality of modems for transport to the destination computing device. The accuracy of bandwidth estimates, such as air interface bandwidth estimates, end-to-end bandwidth estimates, etc., may increase when packets are actually sent over the pathway. By assigning packets to all of the plurality of modems for transport, packets may be broadcast by each of the plurality of modems. As packets are broadcast over the plurality of modems, the bandwidth estimate for each delivery path may be refreshed and the accuracy of the estimate increased In block 718 the scheduler may start the switch period timer. Starting the switch period timer in response to assigning IP packets to all of the plurality of modems may enable the time elapsed since all pathways were used for routing IP packets to the destination device to be tracked. The switch period timer may track the broadcast duration which maybe the time elapsed since all pathways were used for routing IP packets to the destination device. In determination block 720 the scheduler may determine whether the switch period timer is greater than a switch period. A switch period may be a period of time selected to enable packets to be set via the plurality of modems and a steady bandwidth estimate to be determined. The switch period may be any period of time. For example, the switch period may be less than one second, one second, one to two seconds, two seconds, or more than two seconds. Such periods of time may reduce volatility in the bandwidth estimates. In various embodiments, the switch period may be pre-configured for the computing device and/or user selectable. In response to determining that the switch period timer does not exceed the switch period (i.e., determination block 720="No"), the scheduler may continue to monitor the switch period timer in determination block 720. While the switch period has not expired, the scheduler may continue to assign IP packets to all of the plurality of modems.

In response to the switch period expiring (i.e., determination block 720="Yes"), the scheduler may reset the switch period timer in block 722. In determination block 724 the scheduler may determine whether any modem meets a selection criterion. In various embodiments, the selection criterion may include one or more of path preferences, air interface available queue size estimates, air interface available bandwidth estimates, end-to-end bandwidth estimates, and end-to-end delay estimates. For example, the selection criterion may be to select the modem with the highest priority meeting a minimum bandwidth level (e.g., minimum air interface bandwidth estimate, minimum end-to-end bandwidth estimate, etc.). As another example, the selection criterion may be to pick the highest bandwidth modem (e.g., a modem with minimum air interface bandwidth estimate, minimum end-to-end bandwidth estimate, etc.). In some embodiments, the available bandwidth of the modems may be the air interface estimated bandwidth as determined by the respective modems and reported to the scheduler. In some embodiments, the available bandwidth may be the end-to-end bandwidth estimate of each respective delivery path associated with each modem as determined by the scheduler, for example based on sender and receiver reports. Other modem or path attributes may be used with path preferences and/or available bandwidths to form selection criterions, such as error rates, modem capabilities, etc. Selection criterions may be configured such that only one modem of the plurality of modems may meet the selection criteria at any given time. In various embodiments, selection criterions may be pre-configured for the computing device and/or user selectable.

In response to determining that no modem meets the selection criterion (i.e., determination block 724="No"), the scheduler may continue to assign IP packets to all of the plurality of modems in block 716.

In response to determining that a modem meets the selection criterion (i.e., determination block 724="Yes"), the scheduler may set the modem of the plurality of modems meeting the selection criterion as the selected one of the plurality of modems. In this manner, a new selected one of the plurality of modems and new delivery path may be chosen by the scheduler based on the selection criterion. While referred to as a "new" selected one of the plurality of modems and "new" delivery path, the selected modem and associated delivery path in block 726 may be the same modem and associated delivery path with the highest path preference as set in block 704 when that modem meets the other requirements of the selection criterion.

In block 728 the scheduler may reset and restart the last broadcast timer and in block 706 the scheduler may assign IP packets (e.g., TCP packets, UDP packets, etc.) to the selected one of the plurality of modems (i.e., the new selected one of the plurality of modems discussed above). In this manner, the scheduler may return to single delivery path operations in response to a modem meeting the selection criterion by routing IP packets from the scheduler to the selected modem (i.e., the new selected one of the plurality of modems discussed above). As IP packets may only be assigned to the one selected modem for transport, the other unselected modems may not receive IP packets for transport and the broadcasting of IP packets by the unselected modems may stop.

Figure 8:
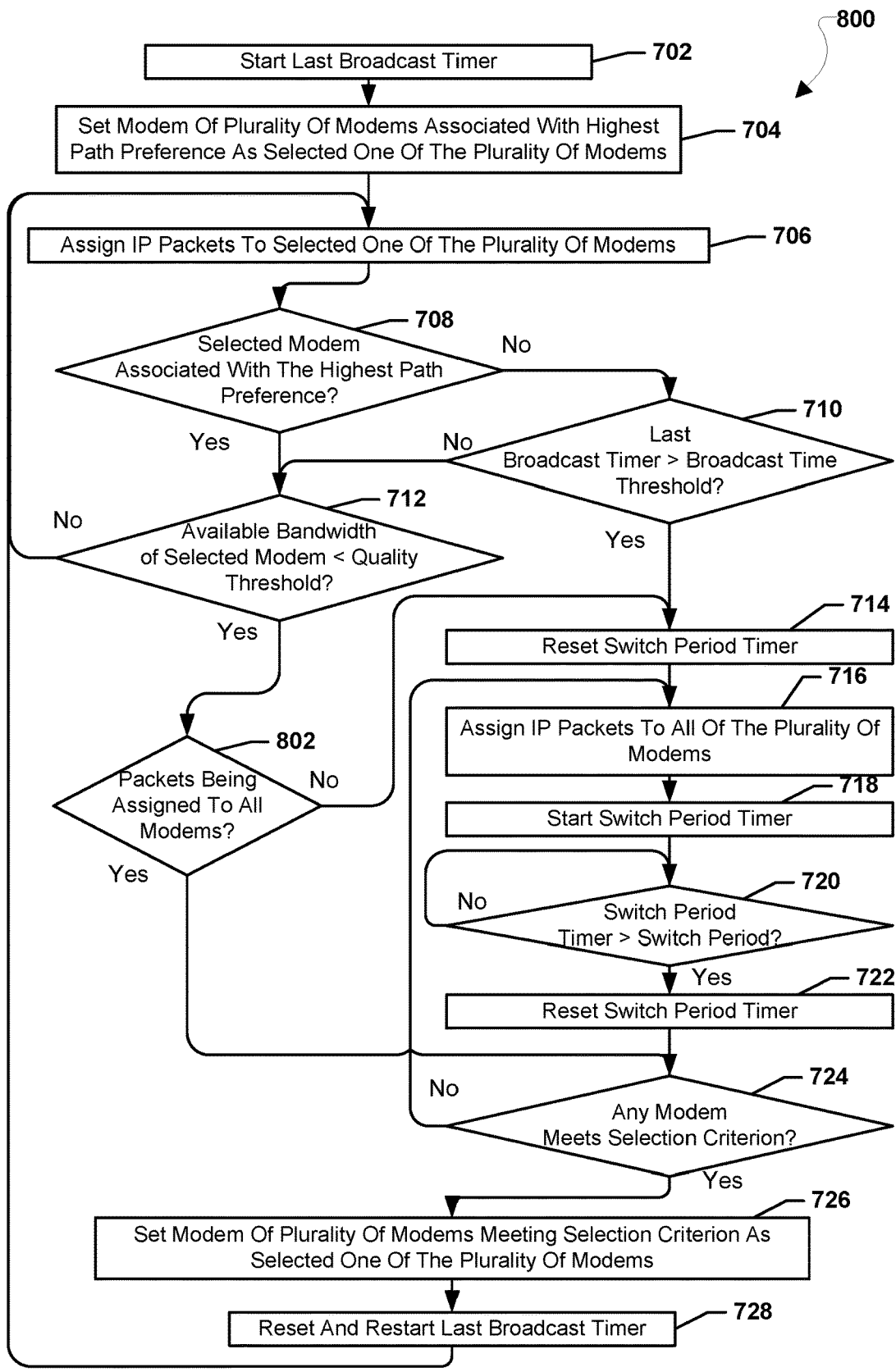
FIG. 8 is a process flow diagram illustrating another embodiment method for assigning packets to a selected one of a plurality of modems for transport.

FIG. 8 illustrates an embodiment method 800 for assigning packets to a selected one of a plurality of modems for transport. The method 800 may enable routing of packets through path selection based on preferences. In various embodiments, the operations of method 800 may be performed by a scheduler running on a processor of a computing device, such as IP level schedulers 302, 404, 504, and 602 described above.

In blocks 702, 704, 706, 708, 710, and 712, the scheduler may perform operations of like numbered blocks of method 700 described above with reference to FIG. 7. In response to determining that the available bandwidth of the selected modem is below the quality threshold (i.e., determination block 712="Yes"), the scheduler may determine whether packets are being assigned to all modems in determination block 802. In various embodiments, the scheduler may determine whether UDP packets are being assigned to all modems. As UDP packets may be assigned to modems for transport using different requirements than TCP packets, UDP packets may already be being assigned to all modems when it is determined that the selected path for TCP packets falls below the quality threshold. The bandwidth estimates for the modems may be accurate because UDP packets may have been recently transported by all the modems even though TCP packets may have been previously assigned to a single path. Thus, when UDP packets are being assigned to all modems, a switch period may not be required. In various embodiments, the scheduler may determine whether TCP packets are being assigned to all modems. As TCP packets may be assigned to modems for transport using different requirements than UDP packets, TCP packets may already be being assigned to all modems when it is determined that the selected path for UDP packets falls below the quality threshold. The bandwidth estimates for the modems may be accurate because TCP packets may have been recently transported by all the modems even though UDP packets may have been previously assigned to a single path. Thus, when TCP packets are being assigned to all modems, a switch period may not be required. In response to determining that packets, such as UDP packets or TCP packets, are being assigned to all modems (i.e., determination block 802="Yes"), the scheduler may determine whether any modems meet the selection criterion in determination block 724 as discussed above.

Figure 9:
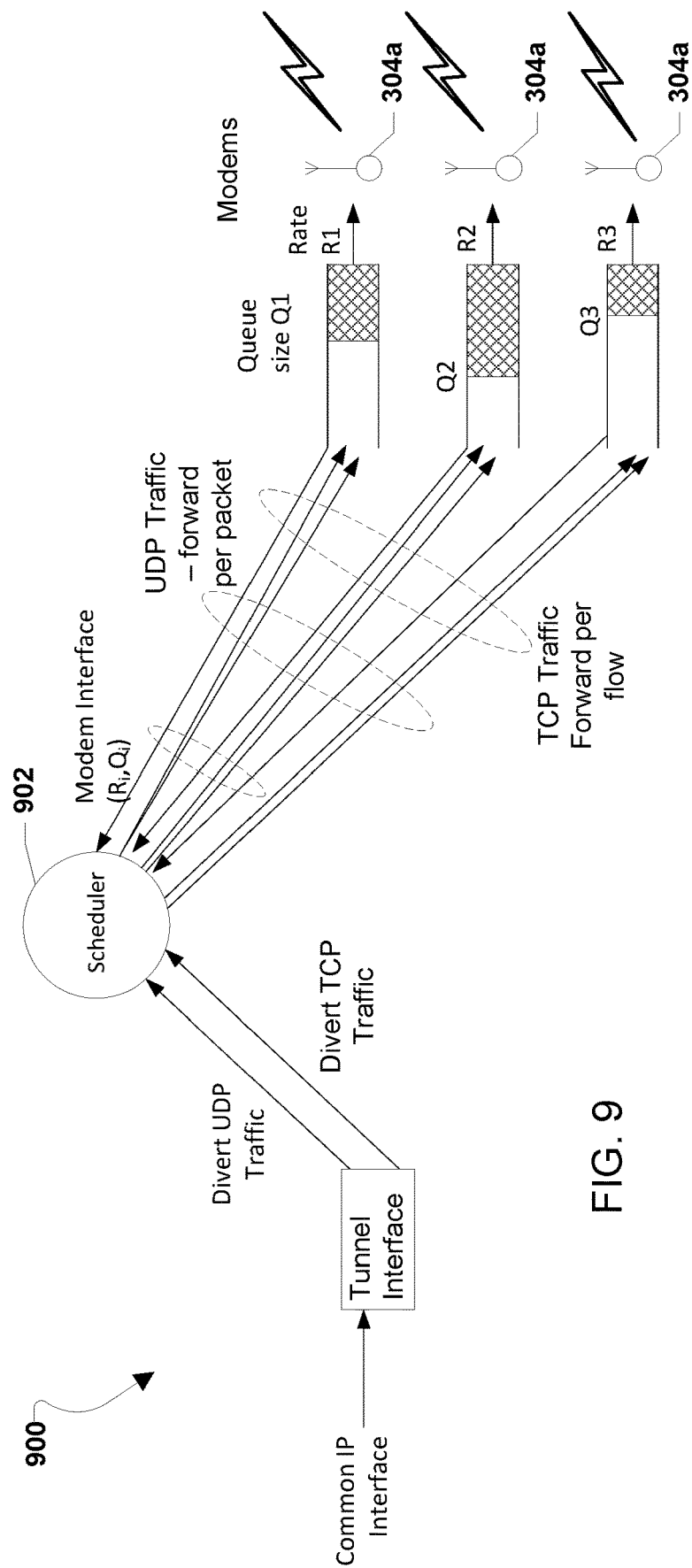
FIG. 9 illustrates TCP and UDP traffic routing operations between a scheduler and modems according to various embodiments.

FIG. 9 is a message traffic flow diagram 900 illustrating TCP and UDP traffic routing operations between a scheduler 902, such as IP level schedulers 302, 404, 504, and 602 described above, and modems 304a, 304b, 304c according to various embodiments. IP traffic, such as TCP packets, UDP packets, etc., may be received by the scheduler 902 at the tunnel interface and IP traffic may be split by packet type. For example, UDP packets may be diverted to the scheduler 902 separate from TCP packets. The scheduler 902 may handle routing of IP traffic in various manners, such as path selection based on preferences and/or packet scheduling based on local least-delay estimates. In various embodiments, TCP packets and UDP packets may be assigned to one of the modems 304a, 304b, 304c based on different requirements or the same requirements. For example, TCP packets and UDP packets may both be routed based on local least-delay estimates. As another example, TCP packets and UDP packets may be both routed through path selection based on preferences. As a further example, TCP packets may be routed through path selection based on preferences and UDP packets may be routed through packet level scheduling based on local least-delay estimates. As further examples, TCP packets and/or UDP packet routing may transition between path preference routing and local least delay routing. As another example, as illustrated in FIG. 9, TCP packets may be forwarded to the modems 304a, 304b, 304c on a per flow or delivery path basis and UDP traffic may be forwarded to the modems 304a, 304b, 304c on a per packet basis.

Figure 10:
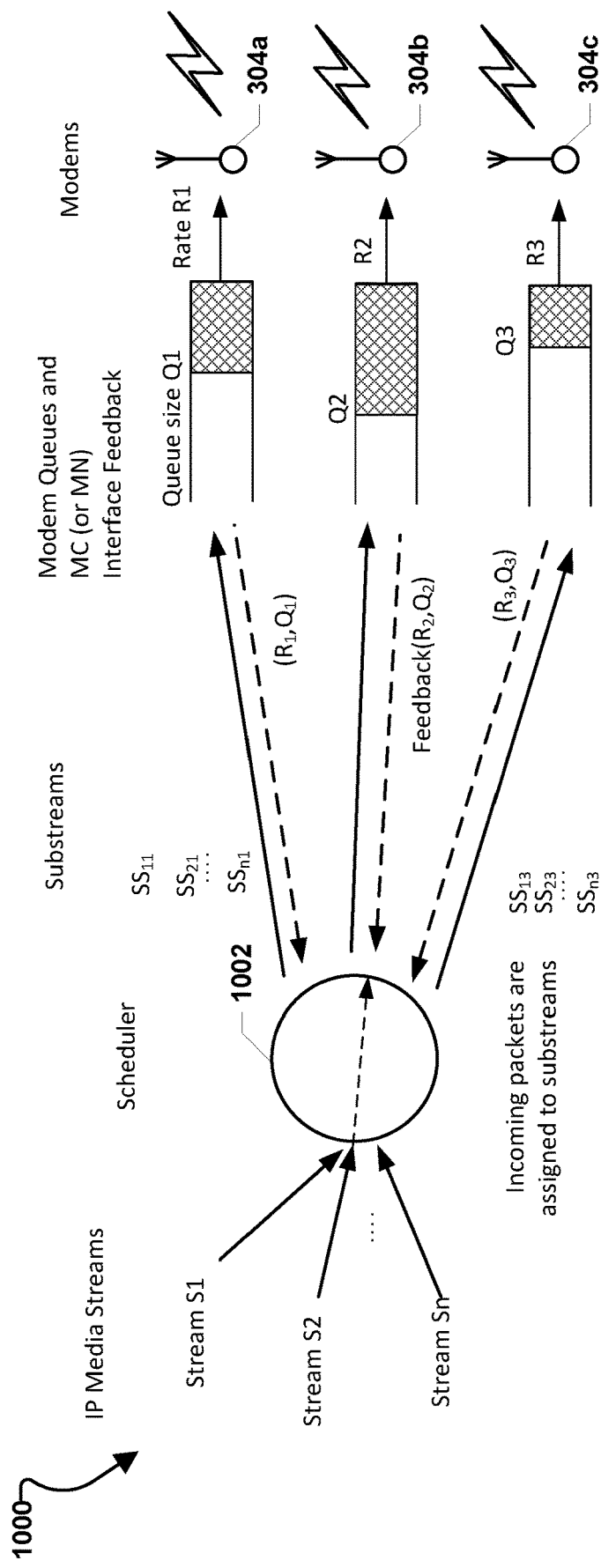
FIG. 10 illustrates packet level interactions between a scheduler and modems according to various embodiments.

FIG. 10 is a message traffic flow diagram 1000 illustrating packet level interactions between a scheduler 1002, such as IP level schedulers 302, 404, 504, 602, and 902 described above, and modems 304a, 304b, 304c according to various embodiments. Incoming packets may be distributed to the modems for delivery. Each stream Si may be split into steams $S_{i1}, S_{i2}, \ldots, S_{in}$, where n is the number of modems available to the scheduler 1002, such as 3 modems. The scheduler 1002 may take into account all available information and various levels of information sharing may occur between the IP layers (or stacks), the scheduler 1002, the modems 304a, 304b, 304c, and the destination device. In various embodiments, the scheduler 1002 may be centralized and operate on all streams simultaneously. In various embodiments, the modems 304a, 304b, 304c may report their respective modem queue levels to the packet schedule via MC (or MN) interface feedback. For example, the modems 304a, 304b, 304c may report their queue size (Qn) and transmission rate (Rn) as feedback on the MC (or MN) interface. Additionally, the modems 304a, 304b, 304c may report their respective air interface available bandwidth estimates as feedback on the MC (or MN) interface. The scheduler 1002 may assign incoming packets to the modems 304a, 304b, 304c based at least in part on the queue size and transmission rates for the modems 304a, 304b, 304c. In various embodiments, a scheduler 1002 may rely on rate and queue level feedback from the modems. In various embodiments, the scheduler 1002 may monitor end-to-end congestion beyond the air interface. The rates per interface may be reduced to accommodate network congestion.

In various embodiments, a scheduler 1002 may receive per path statistics through the MC (or MN). In various embodiments, modems may provide their available rates, queue sizes, and/or air interface available bandwidth estimates through the MC (or MN) interface. In various embodiments, the scheduler 1002 may determine an estimate of the round-trip delay and end-to-end bandwidth based on the exchange of sender and receiver reports exchanged with the destination device.

A subflow receiver report (SRR) may be sent from the destination device. The subflow receiver report (SRR) may include a reference to the last subflow sender report (SSR) received by the destination device in tracking information added to IP packets sent by the scheduler 1002, and an indication of the delay between the reception of said subflow sender report (SSR) and the generation of the subflow receiver report (SRR) at the destination device (i.e., SRR generation delay). The scheduler 1002 may keep track of the generation time of the subflow sender report (SSR) (i.e., the SSR Tx time) and the receipt time of the subflow receiver report (SRR) (i.e., the SRR Rx time).

Once the subflow receiver report (SRR) is received at the scheduler 1002, the scheduler 1002 may determine a round trip time (RTT) estimate on the path on which the subflow sender report (SSR) and subflow receiver report (SRR) were exchanged according to the equation RTT=(SRR Rx time)−(SRR generation delay)−(SSR Tx time). RTT estimates may also be referred to as end-to-end delay (EED) estimates. In various embodiments, the scheduler 1002 may use knowledge of the path rate (Ri) and current queue length (Qi) to enhance the estimate according to the equation RTT=((SRR Rx time)−(Qi/Ri at SRR generation)−(SRR generation delay)−(SSR Tx time)), where the SRR generation time may be determined by subtracting the SSR generation delay from a SRR Tx time. To get the best estimate of queue length (Qi), SRR may be on path i after receiving a MC (or MN) report for that path. Additionally, the once the subflow receiver report (SRR) is received at the scheduler 1002, the scheduler 1002 may determine an end-to-end bandwidth estimate for a path. Similarly, per path sender and receiver reports may be exchanged by the end points. Such per path sender and receiver reports may be similar to the SSRs and SRRs, but at a path level. The per path sender and receiver reports may described all the packets transmitted on a path which may be considered the single subflow on that path.

Figure 11:
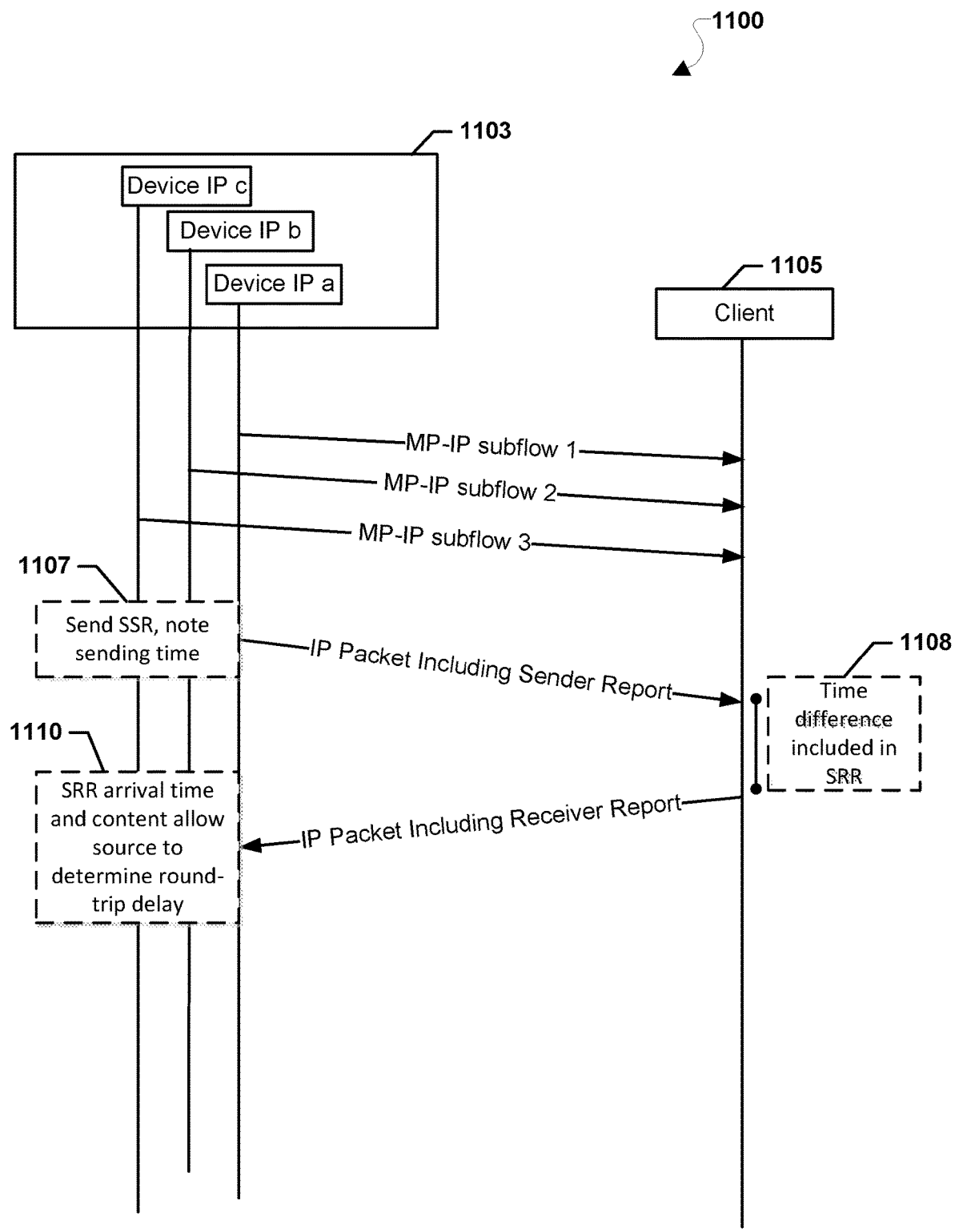
FIG. 11 is a call flow diagram illustrating a sender and receiver exchange between an IP level scheduler and destination computing device.

FIG. 11 is a call flow diagram 1100 illustrating a sender and receiver exchange of a subflow sender report (SSR) and subflow receiver report (SRR) between an IP level scheduler 1103, such as IP level schedulers 302, 404, 504, 602, 902, and 1002 described above, and a destination (or client) computing device 1105, such as client devices 104, 204, 506 described above. At some point after the IP subflows are established, an SSR may be sent in operation 1107 such that the SSR includes the sending time recorded by the IP level scheduler 1103. In operation 1108, the destination (or client) computing device 1105 may determine the time difference between receiving the SSR and sending the SRR and include that time difference in the SRR. In some embodiments, the SRR may include a bandwidth estimate from the destination (or client) computing device 1105. The SRR may be sent to the IP level scheduler 1103. The IP level scheduler 1103 may receive the SRR and, based on the SRR receipt time and the time different between receiving the SSR and sending the SRR in the SRR, determine the round-trip delay (or end-to-end delay) in operation 1110. Additionally, based on the SRR, the IP level scheduler 1103 may determine the end-to-end bandwidth for the path over which the SRR was received.

Figure 12A:
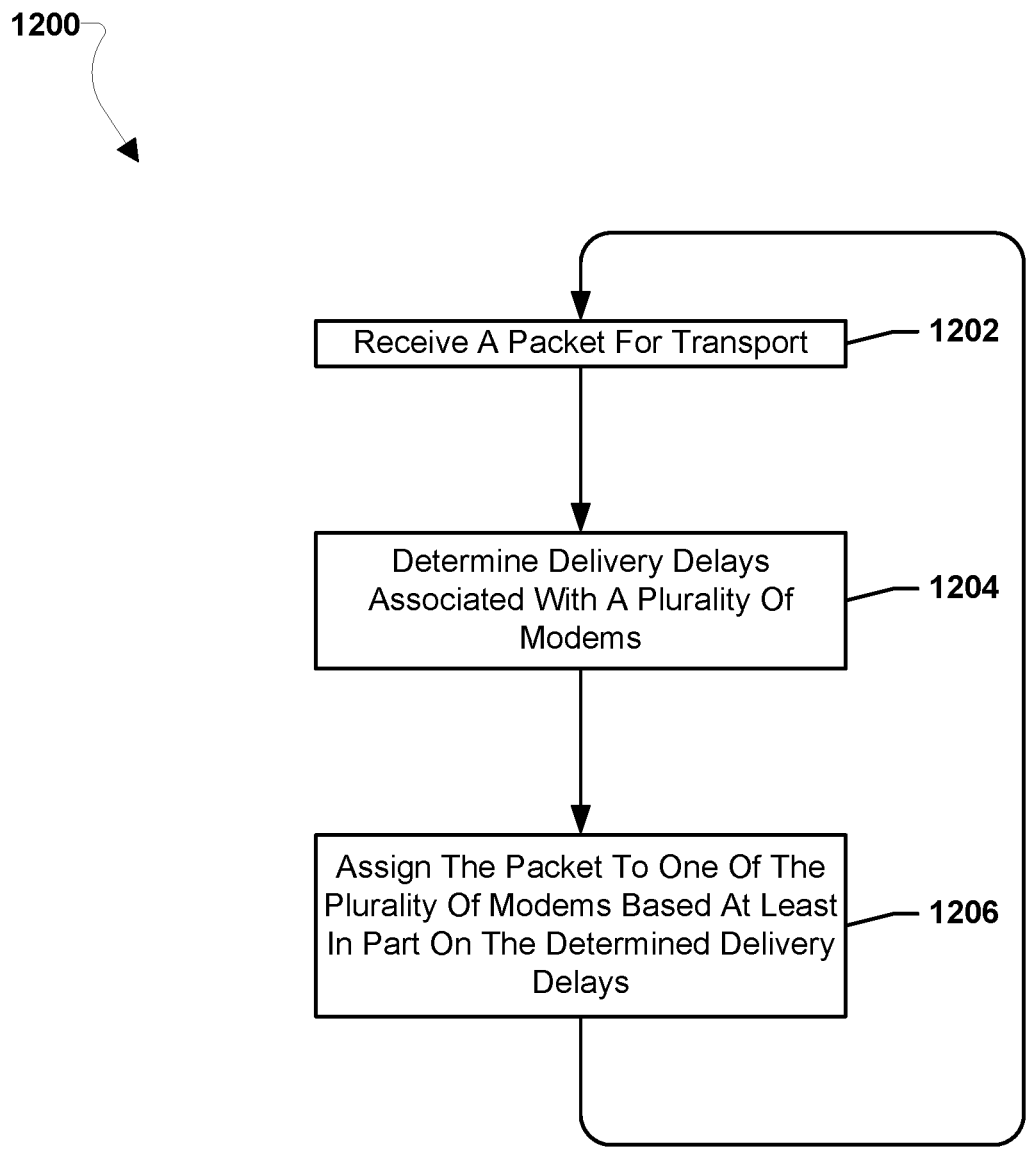
FIG. 12A is a process flow diagram illustrating an embodiment method for scheduling IP transmissions.

FIG. 12A illustrates an embodiment method 1200 for scheduling IP transmissions. In various embodiments, the operations of method 1200 may be performed by a scheduler running on a processor of a computing device, such as IP level schedulers 302, 404, 504, 602, 902, 1002, and 1103 described above. In various embodiments, the operations of method 1200 may be performed in conjunction with the operations of the method 700 described with reference to FIG. 7 and/or method 800 described with reference to FIG. 8.

In block 1202, the scheduler may receive a packet for transport. For example, the packet may be a packet of various IP streams for transport, such as media streams received from encoders for transport to a backend server via various VPNs.

In block 1204, the scheduler may determine delivery delays associated with a plurality of modems. As discussed above, in various embodiments, the scheduler may receive indications of per path statistics for delivery paths associated with each available modem, such as 2, 3, 4, or more modems available for transport. In various embodiments, a scheduler may receive per path statistics through the MC (or MN) interface and/or via traffic information received in IP packets. In various embodiments, modems may provide their available delivery rates and queue sizes through the MC (or MN) interface. In various embodiments, delivery delays may be determined based on one or more of queue sizes of the plurality of modems, delivery rate estimates of the plurality of modems, and end-to-end delay estimates.

In various embodiments, the scheduler may determine a delivery delay associated with one of a plurality of modems (i) based at least in part on the delivery rate estimate for the modem (Ri) and the queue size of the modem (Qi). For example, the scheduler may determine the delivery delay as the packet size (PS) of the packet plus the queue size of the modem (Qi) divided by the delivery rate estimate for the modem (Ri) plus the end-to-end delay (EDD) estimate for the delivery path associated with the modem (i.e., delivery delay=((PS+Qi)/Ri)+EDD). A packet size (PS) may be determined from header information of the packet. A delivery rate estimate for the modem (Ri) and the queue size of the modem (Qi) may be determined from reports received via the MC (or MN) interface and/or through traffic information received in IP packets. An end-to-end delay (EDD) estimate may be determined according to the operations discussed above with reference to FIGS. 11 and 12. In various embodiments, queue size of the modem (Qi) may be updated when the packet is received by subtracting the elapsed time since the last queue size report was received (ElapsedTime) multiplied by the delivery rate estimate for the modem (Ri) from the last reported queue size (Qi) (i.e., Qi=Qi−(ElapsedTime·Ri)).

In block 1206, the scheduler may assign the packet to the one of the plurality of modems based at least in part on the determined delivery delays. In various embodiments, the scheduler may assign the packet to the one of the plurality of modems based at least in part on the determined delivery delays by assigning the packet to the modem with the lowest delivery day among the plurality of delivery delays. In this manner, by comparing the delivery delays determined for each of a plurality of modems, such as 2, 3, 4, or more modems, the scheduler may minimize the delay expected to be experienced in sending the packet at the time the packet is scheduled. In various embodiments, the queue size of the modem (Qi) may be updated between queue reports by adding the packet size (PS) of a packet assigned to the modem to the last determined queue size (i.e., Qi=Qi+PS).

In various embodiments, the scheduler may further assign packets for transport based on delivery delays and path priorities associated with the plurality of modems. For example, as discussed above, delivery paths for the available modems, such as modems 304a, 304b, 304c, may be associated with different priorities based on one or more path attributes such as cost of using delivery paths, bandwidth of delivery paths, QoS of delivery paths, end point indications of a preferred path, etc. The scheduler may account for those relative priorities when assigning packets for transport. For example, one delivery path may be the highest priority path (e.g., due to lowest cost), and the scheduler may determine whether the delivery delay of the modem of that path is above a delay threshold (e.g., 0.2 seconds). In response to determining that the delivery delay is below the delay threshold, the scheduler may assign the packet to that modem. In response to determining that the delivery delay is at or above the delay threshold, the scheduler may assign the packet to the modem with the lowest delivery delay. In this manner, as long as delivery delay for the highest priority path is below the delay threshold, packets may be biased to the modem of the highest priority path.

In response to assigning the packet to a modem, the scheduler may return to block 1202 to await the next packet for scheduling.

In various embodiments, the scheduler may be configured to reduce the delivery rate estimate or bandwidth reported (such as on the MC (or MN) interface) by a percentage to ensure that bandwidth is available on a modem for use in transporting other traffic. Such a bandwidth backoff may be applied to all available modems or to a subset of available modems, such as just a preferred modem. In various embodiments, the percentage reduction may be adjusted depending on the confidence in the delivery rate estimate or bandwidth reported (such as the delivery rate estimate or bandwidth reported on the MC (or MN) interface).

Figure 12B:
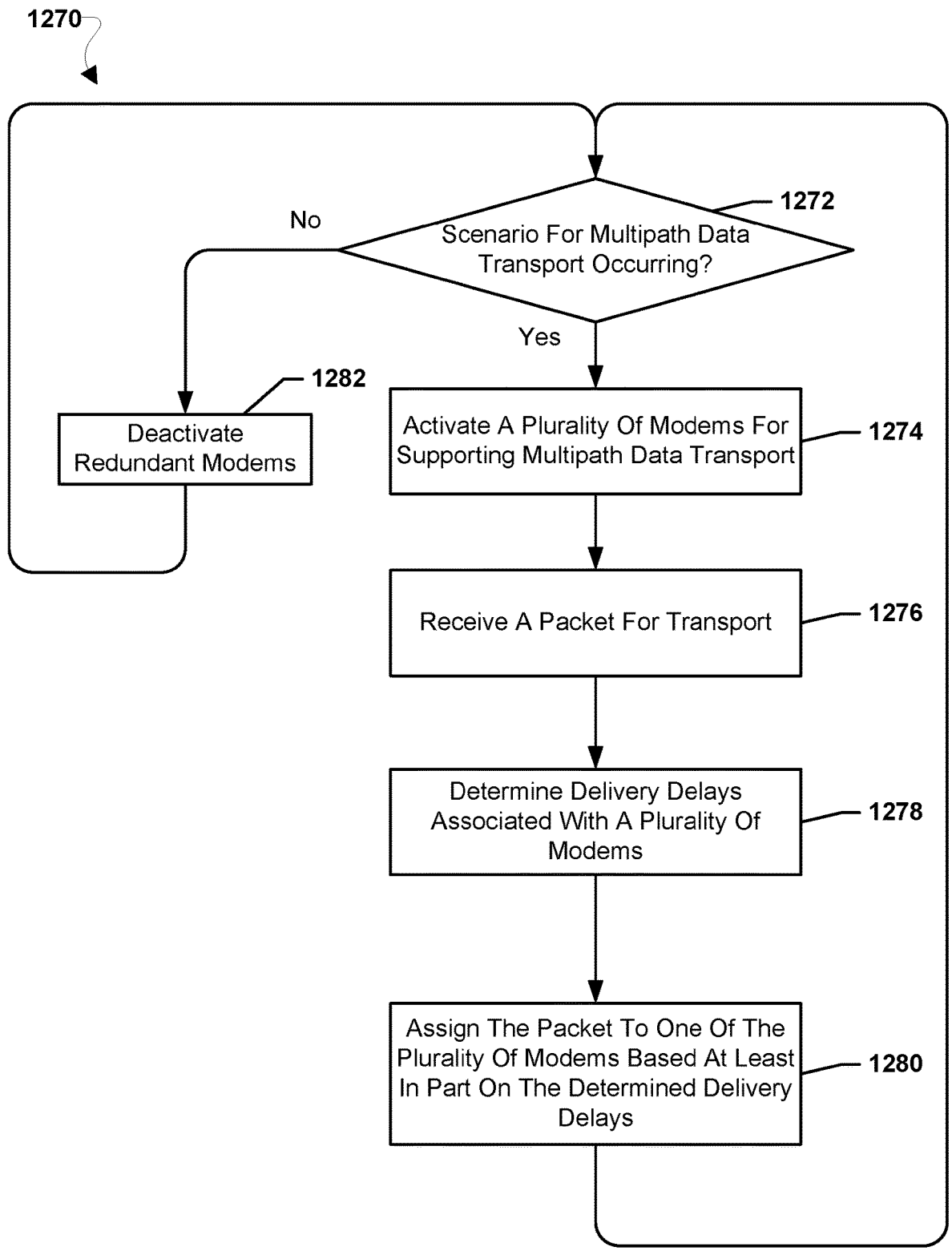
FIG. 12B is a process flow diagram illustrating an embodiment method for scheduling IP transmissions

FIG. 12B illustrates an embodiment method 1270 for scheduling IP transmissions. In various embodiments, the operations of method 1270 may be performed by a scheduler running on a processor of a computing device, such as IP level schedulers 302, 404, 504, 602, 902, 1002, and 1103 described above. In various embodiments, the operations of method 1270 may be performed in conjunction with the operations of the method 700 described with reference to FIG. 7 and/or the method 800 described with reference to FIG. 8.

In determination block 1272, the scheduler of the in-vehicle computing device may determine whether a scenario for multipath data transport is occurring. For example, the scheduler of the in-vehicle computing device may determine whether a scenario for remote teleoperation is occurring which may be a scenario for multipath data transmission. A scenario for remote teleoperation may be a situation involving variable and/or random characteristics that the vehicle computing device or another computing device within the vehicle recognizes as potentially benefiting from remote teleoperation by a remote teleoperator. For example, the high variability and potential randomness in the operations of the police officer 115 and the truck 114 in the merging scenario described with reference to FIG. 1A may be such that the autonomous control algorithms may not be capable of ensuring safe control the vehicle 112 in the scenario. The vehicle computing device or another computing device within the vehicle may recognize the scenario, for example by image detection recognizing the presence of the police officer 115, and the detection of the police officer 115 may be a trigger indicating a scenario for remote teleoperation is occurring. As another example, the scheduler of the in-vehicle computing device may determine whether a scenario for car-to-car mapping is occurring appropriate for multipath data transmission. Car-to-car mapping may benefit from the transmission of data from the vehicle, such as vehicle 112, to another vehicle, such as truck 114, to enable the two vehicles to benefit from all or a portion of the same sensor data map, e.g., a LIDAR image of the vehicle vicinity. Further examples of scenarios for multipath data transmission that the scheduler of the in-vehicle computing device may recognize include: a scenario in which the transport of on vehicle sensor data (e.g., tachometers, accelerometers, etc.) may be required to remote vehicle diagnostic services; a scenario in which the transport of vehicle camera images to other vehicles may be needed to alert those other vehicles of traffic patterns; and a scenario in which the transport of sensor data or camera images to other vehicles or traffic monitoring services to report the status of traffic control equipment may be needed (e.g., whether a traffic light is green or red, whether a traffic light is working or disabled, the posted speed limit for a road as indicated by a highway sign, etc.).

In response to determining that a scenario for multipath data transport is occurring (i.e., determination block 1272="Yes"), the scheduler of the in-vehicle computing device may activate a plurality of modems for supporting multipath data transport in block 1274. The plurality of modems may include two, three, four, or more modems. The plurality of modems may be different modems, such as different LTE modems, different V2X modems, an assortment of different type modems, etc. Each of the plurality of modems may be configured to establish connections via different service providers. Upon activation, each of the plurality of modems may establish its own respective different delivery path through the delivery cloud to a remote teleoperator computing device, such as computing device 104 (FIGS. 1A and 1B). The different delivery paths may each be separate delivery paths through the delivery cloud routed from distinct IP addresses of the in-vehicle computing device to one or more IP addresses of the remote teleoperator computing device. For example, each of the activated plurality of modems may have its own delivery path with a unique IP address for the in-vehicle computing device side while all delivery paths may have the same IP address for the remote teleoperator computing device side. As another example, in remote scenarios, the remote teleoperator computing device side may have multiple IP addresses, each valid on a different delivery network. In various embodiments, each of the plurality of modems and their respective delivery paths may be assigned different priorities, such as one delivery path being prioritized over the other delivery paths. Delivery paths may be prioritized relative to one another based on one or more path attributes associated with the delivery paths, such as cost, bandwidth, quality-of-service (QoS), etc.

In block 1276, the scheduler of the in-vehicle computing device may receive a packet for transport, such as a packet carrying data supporting remote teleoperation. Data supporting remote teleoperation may include data generated by cameras, sensors, or other systems of a vehicle to be used by a remote teleoperator to control the vehicle. The data may be packetized and received from encoders or other signal processing devices for transport to remote teleoperator computing device. For example, the packet may be a packet of various IP streams for transport, such as media streams received from encoders, for transport to a backend server or other remote teleoperator computing device via various VPNs.

In block 1278, the scheduler of the in-vehicle computing device may determine delivery delays associated with a plurality of modems. As discussed above, in various embodiments, the scheduler of the in-vehicle computing device may receive indications of per path statistics for delivery paths associated with each available modem, such as 2, 3, 4, or more modems available for transport. In various embodiments, a scheduler of the in-vehicle computing device may receive per path statistics through the MC (or MN) interface and/or via traffic information received in IP packets. In various embodiments, modems may provide their available delivery rates and queue sizes through the MC (or MN) interface. In various embodiments, delivery delays may be determined based on one or more of queue sizes of the plurality of modems, delivery rate estimates of the plurality of modems, and end to end delay estimates.

In various embodiments, the scheduler of the in-vehicle computing device may determine a delivery delay associated with one of a plurality of modems (i) based at least in part on the delivery rate estimate for the modem (Ri) and the queue size of the modem (Qi). For example, the scheduler of the in-vehicle computing device may determine the delivery delay as the packet size (PS) of the packet plus the queue size of the modem (Qi) divided by the delivery rate estimate for the modem (Ri) plus the end to end delay (EDD) estimate for the delivery path associated with the modem (i.e., delivery delay=((PS+Qi)/Ri)+EDD). A packet size (PS) may be determined from header information of the packet. A delivery rate estimate for the modem (Ri) and the queue size of the modem (Qi) may be determined from reports received via the MC (or MN) interface and/or via traffic information received in IP packets. An end to end delay (EDD) estimate may be determined according to the operations discussed above with reference to FIGS. 11 and 12. In various embodiments, queue size of the modem (Qi) may be updated when the packet is received by subtracting the elapsed time since the last queue size report was received (ElapsedTime) multiplied by the delivery rate estimate for the modem (Ri) from the last reported queue size (Qi) (i.e., Qi=Qi−(ElapsedTime−Ri)).

In block 1280, the scheduler of the in-vehicle computing device may assign the packet to the one of the plurality of modems based at least in part on the determined delivery delays. In various embodiments the scheduler of the in-vehicle computing device may assign the packet to the one of the plurality of modems based at least in part on the determined delivery delays by assigning the packet to the modem with the lowest delivery day among the plurality of delivery delays. In this manner, by comparing the delivery delays determined for each of a plurality of modems, such as 2, 3, 4, or more modems, the scheduler of the in-vehicle computing device may minimize the delay expected to be experienced in sending the packet at the time the packet is scheduled. In various embodiments, the queue size of the modem (Qi) may be updated between queue reports by adding the packet size (PS) of a packet assigned to the modem to the last determined queue size (i.e., Qi=Qi+PS).

In various embodiments, the scheduler of the in-vehicle computing device may further assign packets for transport based on delivery delays and path priorities associated with the plurality of modems. For example, as discussed above, delivery paths for the available modems, such as modems 1, 2, and 3 (304a, 304b, 304c), may be associated with different priorities based on one or more path attributes such as cost of using delivery paths, bandwidth of delivery paths, QoS of delivery paths, end point indications of a preferred path, etc. The scheduler of the in-vehicle computing device may account for those relative priorities when assigning packets for transport. For example, one delivery path may be the highest priority path (e.g., due to lowest cost), and the scheduler of the in-vehicle computing device may determine whether the delivery delay of the modem of that path is above a delay threshold (e.g., 0.2 seconds). In response to determining the delivery delay is below the delay threshold, the scheduler of the in-vehicle computing device may assign the packet to that modem. In response to determining the delivery delay is at or above the delay threshold, the scheduler of the in-vehicle computing device may assign the packet to the modem with the lowest delivery delay. In this manner, as long as delivery delay for the highest priority path is below the delay threshold, packets may be biased to the modem of the highest priority path. Additionally, the scheduler of the in-vehicle computing device may further assign packets for transport based on delivery delays, path priorities associated with the plurality of modems, and computing resource pool priorities. For example, the scheduler of the in-vehicle computing device may prioritize packets generated by certain computing resources over other computing resources and may account for those relative priorities when assigning packets for transport.

In response to assigning the packet to a modem, the scheduler of the in-vehicle computing device may return to block 1272 and determine again whether a scenario for multipath data transport is occurring. In response to determining that a scenario for multipath transport is not occurring (i.e., determination block 1272="No"), the scheduler of the in-vehicle computing device may deactivate redundant modems in block 1282. Deactivating redundant modems may include deactivating all or a portion of the modems. For example, all but the modem associated with a highest priority path may be deactivated. As another example, all the modems may be deactivated. By deactivating redundant modems, computing resources and/or power may be conserved and costs associated with maintaining unneeded delivery paths may be avoided.

In various embodiments, the scheduler of the in-vehicle computing device may be configured to reduce the delivery rate estimate or bandwidth reported (such as on the MC (or MN) interface) by a percentage to ensure that bandwidth is available on a modem for use in transporting other traffic. Such a bandwidth backoff may be applied to all available modems or to a subset of available modems, such as just a preferred modem. In various embodiments, the percentage reduction may be adjusted depending on the confidence in the delivery rate estimate or bandwidth reported (such as the delivery rate estimate or bandwidth reported on the MC (or MN) interface).

Figure 13:
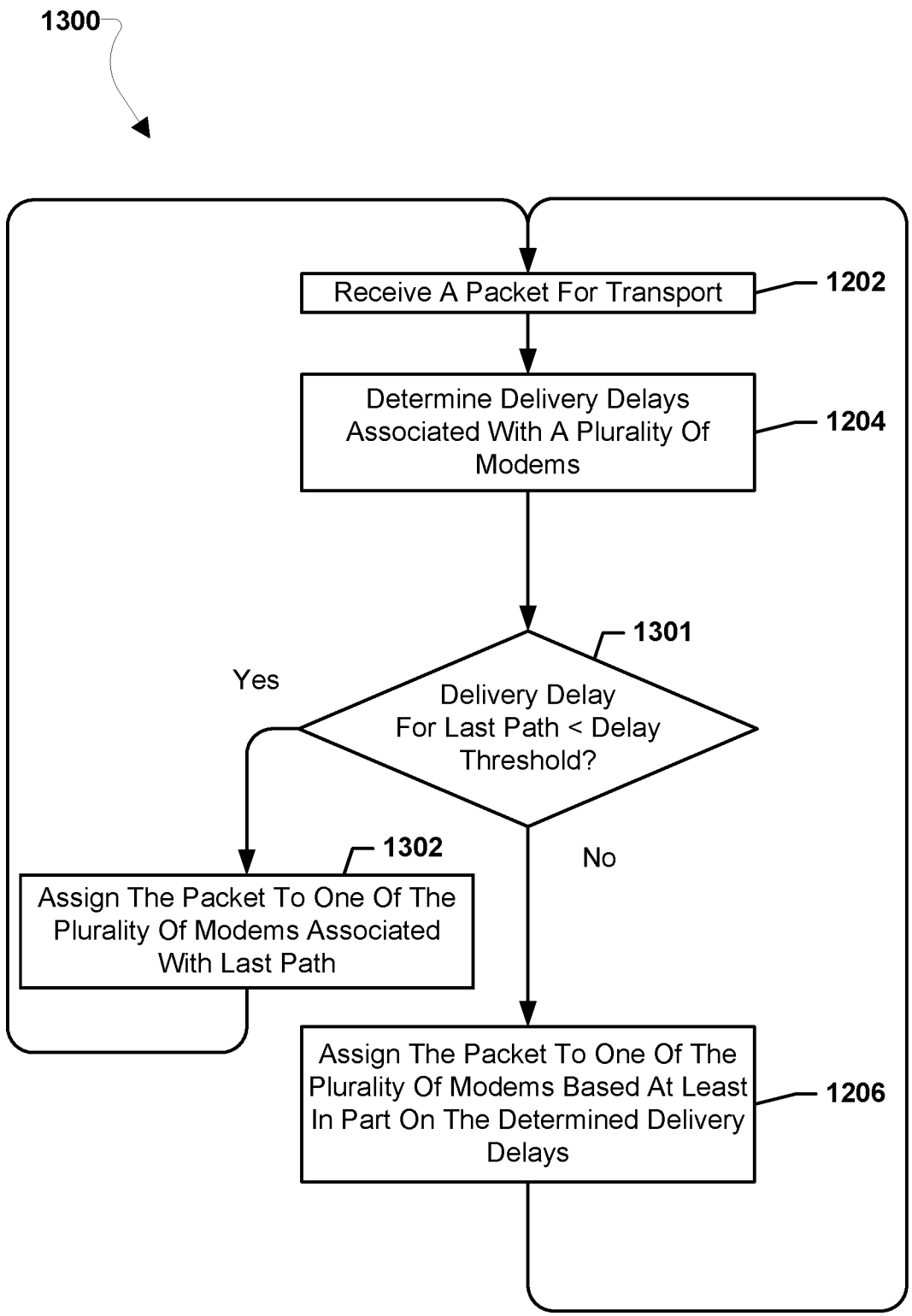
FIG. 13 is a process flow diagram illustrating another embodiment method for scheduling IP transmissions.

FIG. 13 illustrates an embodiment method 1300 for scheduling IP transmissions. In various embodiments, the operations of method 1300 may be performed by a scheduler running on a processor of a computing device, such as IP level schedulers 302, 404, 504, 602, 902, 1002, and 1103 described above. In various embodiments, the operations of method 1300 may be performed in conjunction with the operations of the method 700 described with reference to FIG. 7, the method 800 described with reference to FIG. 8, the method 1200 described with reference to FIG. 12A, and/or the method 1270 described with reference to FIG. 12B.

In blocks 1202 and 1204 the schedule may receive a packet for transport and determine delivery delays associated with a plurality of modems as described above. In determination block 1301 the scheduler may determine whether the delivery delay of the last path is less than a delay threshold. The delay threshold may be any threshold. For example, a delay threshold may be fifty milliseconds. The delay threshold may be pre-configured and/or user configured. In various embodiments, rather than being a static threshold (e.g., a set threshold of a single value, such as fifty milliseconds), the delay threshold may be relative to a lowest delay path. For example, the delay threshold may be a value, such as a number of milliseconds, above the lowest delivery delay of the plurality of modems. Thus, determining whether the delivery delay of the last path is less than the delay threshold may include determining whether the delivery of the last path is less than the lowest delivery delay of the plurality of modems plus the value. A scheduler may keep track of the last path, such as last source and destination IP addresses and ports, and may compare the delay estimate for that port to the delay threshold (e.g., static, relative to the lowest delay path, etc.) to determine whether the delivery delay of the last path is less than the delay threshold In response to the delivery delay for the last path being less than the delay threshold (e.g., static, relative to the lowest delay path, etc.) (i.e., determination block 1301="Yes"), the scheduler may assign the packet to the one of the plurality of modems associated with the last path in block 1302. In this manner, re-assignment of UDP packets to a new one of a plurality of modems based on local least-delay estimates may be prevented when a local least-delay estimate for a previous one of the plurality of modems is below a delay threshold. The assignment of the packet to the same modem may reduce reorganizing of the packets at the receiver/destination side. In response to determining that the delivery delay for the last path is at or above the delay threshold (e.g., static, relative to the lowest delay path, etc.) (i.e., determination block 1301="No"), the scheduler may assign the packet to one of the plurality of modems based at least in part on the determined delivery delays in block 1206 as described above.

Figure 14:
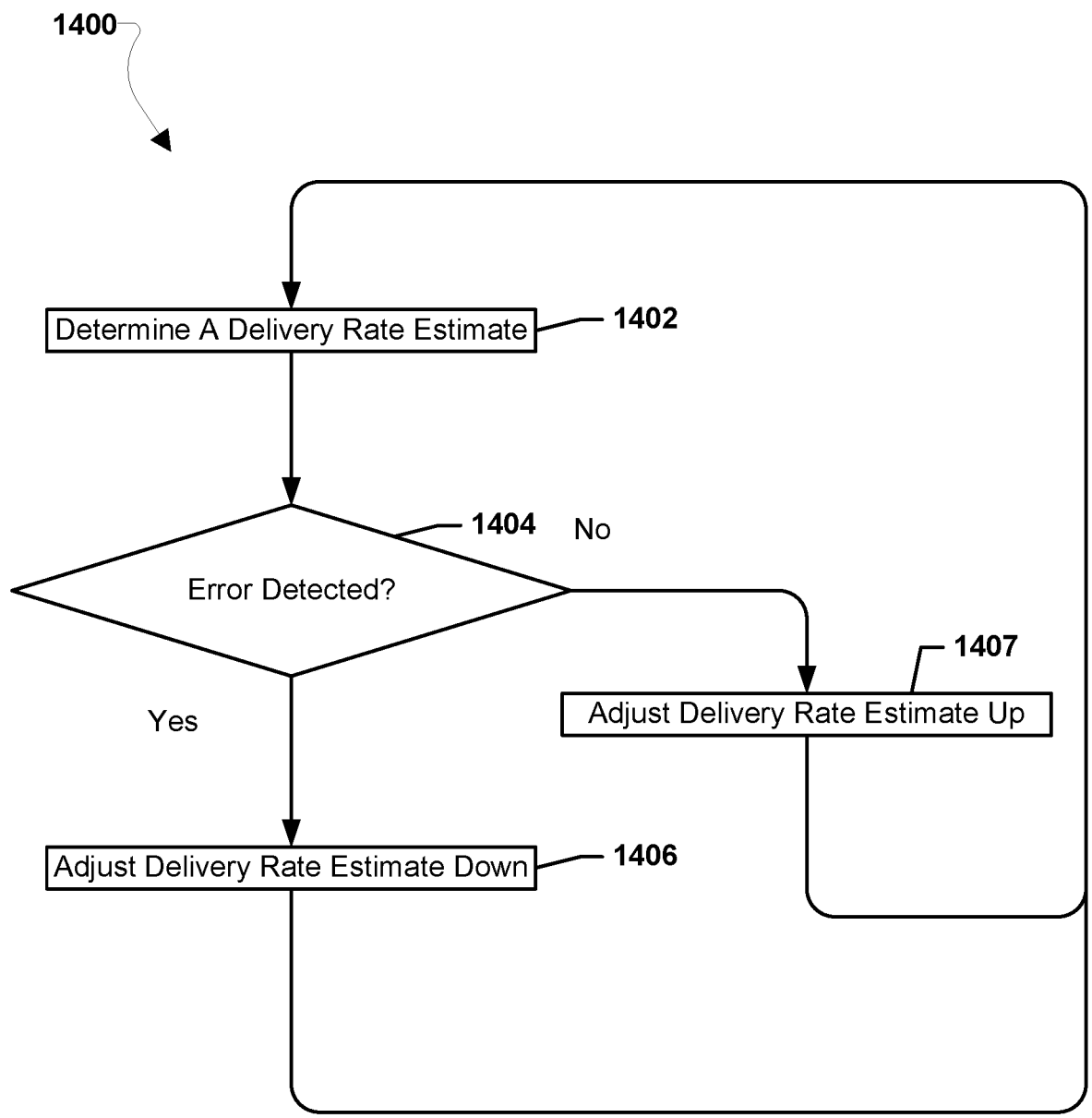
FIG. 14 is a process flow diagram illustrating an embodiment method for adjusting delivery rate estimates based on error detections.

FIG. 14 illustrates an embodiment method 1400 for adjusting delivery rate estimates based on error detections. In various embodiments, the operations of the method 1400 may be performed by a scheduler running on a processor of a computing device, such as IP level schedulers 302, 404, 504, 602, 902, 1002, and 1103 described above. In various embodiments, the operations of the method 1400 may be performed in conjunction with the operations of the method 700 described with reference to FIG. 7, the method 1050 described with reference to FIG. 8, the method 1200 described with reference to FIG. 12A, and/or the method 1300 described with reference to FIG. 13.

In block 1402 the scheduler may determine a delivery rate estimate. In various embodiments, the scheduler may determine the delivery rate estimate based on path statistics delivered through the MC (or MN) interface and/or via traffic information received in IP packets. Path statistics may include a reported delivery rate estimate. In various embodiments, the delivery rate estimate may be a delivery rate estimate the scheduler adjusted by a percentage to ensure that bandwidth was available on a modem for use in transporting other traffic.

In determination block 1404, the scheduler may determine whether an error is detected associated with the path for the modem. In various embodiments, errors may be detected by the scheduler receiving an error report from the modem.

In response to determining that no error is detected (i.e., determination block 1404="No"), the scheduler adjust the delivery rate estimate up in block 1407 and may return to block 1402 to determine a next delivery rate estimate. For example, when errors are not detected in a reporting period, the error factor may be increased by adding a percentage point to the error factor. In an embodiment, the scheduler may update the delivery rate estimate according to fixed equations. As another example, when no error is detected the rate may be increased by a fixed percentage. In various embodiments, when the rate is at 100%, no further adjustment may be performed. In various embodiments, delivery rate adjustments may be made every round trip time.

In response to determining that an error is detected (i.e., determination block 1404="Yes"), the scheduler may adjust the delivery rate estimate in block 1406. Adjusting the delivery rate estimate may occur in an outer-loop processes that occurs in parallel to receiving and assigning packets by the scheduler. In an embodiment, the scheduler may update the delivery rate estimate based on an error factor. For example, the updated delivery rate estimate may be determined based on the current delivery rate estimate times the error factor. The error factor may start at 100%. When an error is detected, the error factor may be reduced by half. In an embodiment, the scheduler may update the delivery rate estimate according to fixed equations. For example, when an error is detected, the rate may be divided by half. In some embodiments, the scheduler may select between the reported delivery rate estimate from the modem and the adjusted delivery rate estimate when determining a delivery delay. For example, the scheduler may select the lower delivery rate estimate of the two when assigning packets.

Figure 15:
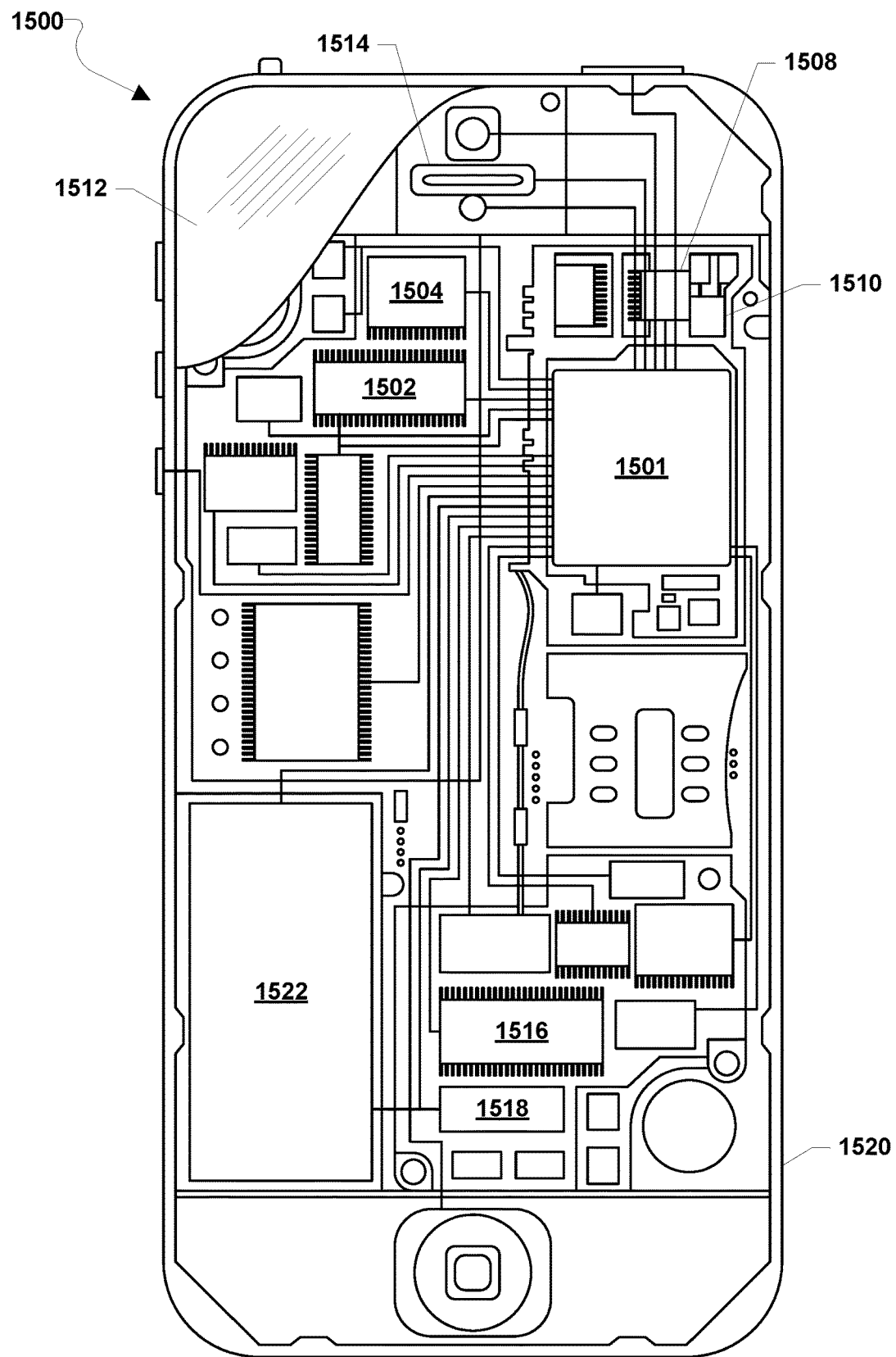
FIG. 15 is a component diagram of an example computing device suitable for use with the various embodiments.

The various embodiments (including, but not limited to, embodiments discussed above with reference to FIGS. 1-14) may be implemented in any of a variety of the computing devices (e.g., mobile devices), an example of which is illustrated in FIG. 15. For example, the mobile device 1500 may include a processor 1501 coupled to a touch screen controller 1504 and an internal memory 1502. The processor 1501 may be one or more multicore integrated circuits (ICs) designated for general or specific processing tasks. The internal memory 1502 may be volatile or non-volatile memory, and may also be secure and/or encrypted memory, or unsecure and/or unencrypted memory, or any combination thereof. The touch screen controller 1504 and the processor 1501 may also be coupled to a touch screen panel 1512, such as a resistive-sensing touch screen, capacitive-sensing touch screen, infrared sensing touch screen, etc. The mobile device 1500 may have one or more radio signal transceivers 1508 (e.g., Peanut®, Bluetooth®, Zigbee®, ANT, Wi-Fi, WiGig, V2X, RF, cellular, etc.) and antennae 1510, for sending and receiving, coupled to each other and/or to the processor 1501. The transceivers 1508 and antennae 1510 may be used with the above-mentioned circuitry to implement the various wireless transmission protocol stacks and interfaces. The mobile device 1500 may include one or more cellular network wireless modem chips 1516, such as one cellular network wireless modem chip, two cellular network wireless modem chips, three cellular network wireless modem chips, four cellular network wireless modem chips, or more than four cellular network wireless modem chips, that enables communication via one or more cellular networks (e.g., CDMA, TDMA, GSM, PCS, 3G, 4G, LTE, V2X, or any other type of cellular networks) and that are coupled to the processor 1501.

The mobile device 1500 may include a peripheral device connection interface 1518 coupled to the processor 1501. The peripheral device connection interface 1518 may be singularly configured to accept one type of connection, or multiply configured to accept various types of physical and communication connections, common or proprietary, such as USB, FireWire, Thunderbolt, Ethernet, or PCIe. The peripheral device connection interface 1518 may also be coupled to a similarly configured peripheral device connection port (not shown). The mobile device 1500 may also include speakers 1514 for providing audio outputs.

The mobile device 1500 may also include a housing 1520, constructed of a plastic, metal, or a combination of materials, for containing all or some of the components discussed herein. The mobile device 1500 may include a power source 1522 coupled to the processor 1501, such as a disposable or rechargeable battery. The rechargeable battery may also be coupled to the peripheral device connection port to receive a charging current from a source external to the mobile device 1500.

Figure 16:
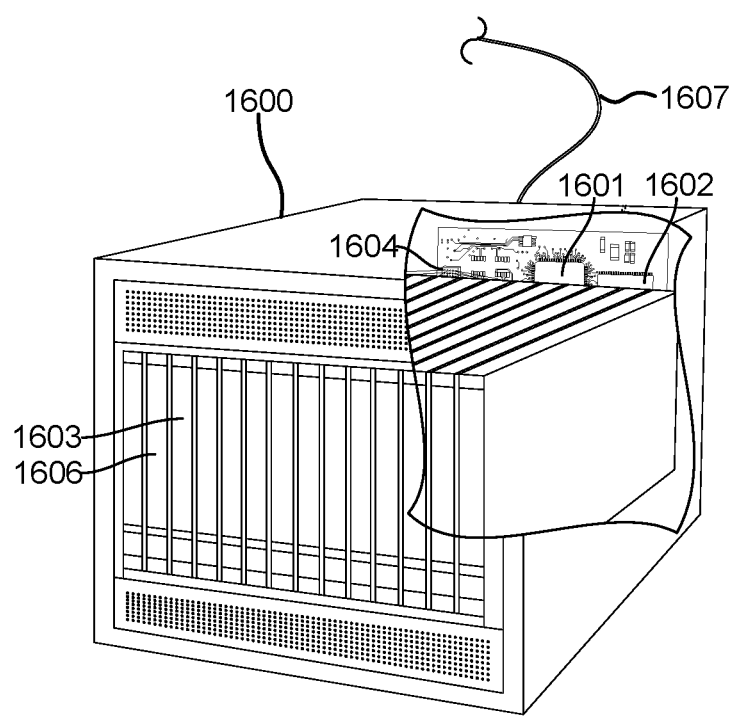
FIG. 16 is a component diagram of an example server suitable for use with the various embodiments.

The various embodiments (including, but not limited to, embodiments discussed above with reference to FIGS. 1-14) may also be implemented on any of a variety of commercially available server devices, such as the server 1600 illustrated in FIG. 16. Such a server 1600 typically includes a processor 1601 coupled to volatile memory 1602 and a large capacity nonvolatile memory, such as a disk drive 1604. The server 1600 may also include a floppy disc drive, compact disc (CD) or digital versatile disc (DVD) disc drive 1606 coupled to the processor 1601. The server 1600 may also include one or more wired or wireless network transceivers 1603, such one or more network access ports and/or wired or wireless modems (e.g., one wireless modem, two wireless modems, three wireless modems, four wireless modems, or more than four wireless modems), coupled to the processor 1601 for establishing network interface connections with one or more communication networks 1607, such as a local area network (e.g., Ethernet, etc.) coupled to other computing devices and/or servers, the Internet, the public switched telephone network, and/or one or more cellular networks (e.g., CDMA, TDMA, GSM, PCS, 3G, 4G, LTE, or any other type of cellular network).

The processors 1501 and 1601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1501 and 1601. The processors 1501 and 1601 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 1501 and 1601 including internal memory or removable memory plugged into the device and memory within the processors 1501 and 1601 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes CD, laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for Internet Protocol (IP) transmission from a vehicle, comprising:
    determining, in a scheduler running on a processor of an in-vehicle computing device, whether an available bandwidth of a selected one of a plurality of modems drops below a quality threshold;
    determining, in the scheduler, whether the selected one of the plurality of modems is associated with a highest priority delivery path,
    wherein determining, in the scheduler, whether the available bandwidth of the selected one of the plurality of modems drops below the quality threshold comprises determining, in the scheduler, whether the available bandwidth of the selected one of the plurality of modems drops below the quality threshold in response to determining that the selected one of the plurality of modems is associated with the highest priority delivery path;
    assigning, by the scheduler, IP packets to all of the plurality of modems for transport in response to determining that the available bandwidth of the selected one of the plurality of modems has dropped below the quality threshold;
    determining, in the scheduler, whether any of the plurality of modems meet a selection criterion;
    selecting, in the scheduler, one modem of the plurality of modems meeting the selection criterion as a new selected one of the plurality of modems; and
    assigning, by the scheduler, the IP packets to only the new selected one of the plurality of modems for transport.

2. The method of claim 1, wherein the available bandwidth of the selected one of the plurality of modems is an air interface available bandwidth estimate or an end-to-end bandwidth estimate.

3. The method of claim 1, further comprising:
    determining, in the scheduler, whether a broadcast time threshold is exceeded in response to determining that the selected one of the plurality of modems is not associated with the highest priority delivery path,
    wherein assigning, by the scheduler, the IP packets to all of the plurality of modems for transport in response to determining that the available bandwidth of the selected one of the plurality of modems has dropped below the quality threshold comprises assigning, by the scheduler, the IP packets to all of the plurality of modems for transport in response to the broadcast time threshold being exceeded.

4. The method of claim 1, wherein the selection criterion comprises one or more of a path preference, an air interface queue size estimate, an air interface available bandwidth estimate, an end-to-end bandwidth estimate, and an end-to-end delay estimate.

5. The method of claim 1, further comprising:
    determining, in the scheduler, whether User Datagram Protocol (UDP) packets are being assigned to all of the plurality of modems in response to determining that the available bandwidth of the selected one of the plurality of modems drops below the quality threshold; and
    determining, in the scheduler, whether any of the plurality of modems meet the selection criterion in response to determining that the UDP packets are being assigned to all of the plurality of modems.

6. The method of claim 5, wherein Transmission Control Protocol (TCP) packets and the UDP packets are assigned to one of the plurality of modems based at least in part on one or more of a path selection based on a preference or packet scheduling based on local least-delay estimates.

7. The method of claim 1, wherein the plurality of modems is three or more modems.

8. An in-vehicle computing device, comprising:
a plurality of modems; and
a processor configured with processor-executable instructions to perform operations comprising:
determining whether an available bandwidth of a selected one of the plurality of modems drops below a quality threshold;
determining whether the selected one of the plurality of modems is associated with a highest priority delivery path, wherein determining whether the available bandwidth of the selected one of the plurality of modems drops below the quality threshold comprises determining whether the available bandwidth of the selected one of the plurality of modems drops below the quality threshold in response to determining that the selected one of the plurality of modems is associated with the highest priority delivery path;
assigning Internet Protocol (IP) packets to all of the plurality of modems for transport in response to determining that the available bandwidth of the selected one of the plurality of modems has dropped below the quality threshold;
determining whether any of the plurality of modems meet a selection criterion;
selecting one modem of the plurality of modems meeting the selection criterion as a new selected one of the plurality of modems; and
assigning the IP packets to only the new selected one of the plurality of modems for transport.

9. The in-vehicle computing device of claim 8, wherein the available bandwidth of the selected one of the plurality of modems is an air interface available bandwidth estimate or an end-to-end bandwidth estimate.

10. The in-vehicle computing device of claim 8, wherein:
the processor is configured with processor-executable instructions to perform operations further comprising determining whether a broadcast time threshold is exceeded in response to determining that the selected one of the plurality of modems is not associated with the highest priority delivery path, and wherein
assigning the IP packets to all of the plurality of modems for transport in response to determining that the available bandwidth of the selected one of the plurality of modems has dropped below the quality threshold comprises assigning the IP packets to all of the plurality of modems for transport in response to the broadcast time threshold being exceeded.

11. The in-vehicle computing device of claim 8, wherein the selection criterion comprises one or more of a path preference, an air interface queue size estimate, an air interface available bandwidth estimate, an end-to-end bandwidth estimate, and an end-to-end delay estimate.

12. The in-vehicle computing device of claim 8, wherein the processor is configured with processor-executable instructions to perform operations further comprising:
determining whether User Datagram Protocol (UDP) packets are being assigned to all of the plurality of modems in response to determining that the available bandwidth of the selected one of the plurality of modems drops below the quality threshold; and
determining whether any of the plurality of modems meet the selection criterion in response to determining that the UDP packets are being assigned to all of the plurality of modems.

13. The in-vehicle computing device of claim 12, wherein Transmission Control Protocol (TCP) packets and the UDP packets are assigned to one of the plurality of modems based at least in part on one or more of a path selection based on a preference or packet scheduling based on local least-delay estimates.

14. The in-vehicle computing device of claim 8, wherein the plurality of modems is three or more modems.

* * * * *